United States Patent
Delaney

(10) Patent No.: US 10,445,845 B2
(45) Date of Patent: Oct. 15, 2019

(54) COMMUNICATING IN CHAT SESSIONS USING CHAT BOTS TO PROVIDE REAL-TIME RECOMMENDATIONS FOR NEGOTIATIONS

(71) Applicant: PAYPAL, INC., San Jose, CA (US)

(72) Inventor: Jennifer Delaney, Mountain View, CA (US)

(73) Assignee: PayPal, Inc., San Jose, CA (US)

( * ) Notice: Subject to any disclaimer, the term of this patent is extended or adjusted under 35 U.S.C. 154(b) by 528 days.

(21) Appl. No.: 15/199,414

(22) Filed: Jun. 30, 2016

(65) Prior Publication Data
US 2018/0005288 A1    Jan. 4, 2018

(51) Int. Cl.
| | |
|---|---|
| G06Q 30/00 | (2012.01) |
| G06Q 50/18 | (2012.01) |
| G06Q 30/06 | (2012.01) |
| H04L 12/58 | (2006.01) |
| H04L 29/08 | (2006.01) |
| G06Q 30/02 | (2012.01) |
| G06Q 20/10 | (2012.01) |
| G06F 16/9535 | (2019.01) |

(52) U.S. Cl.
CPC ....... *G06Q 50/188* (2013.01); *G06F 16/9535* (2019.01); *G06Q 20/102* (2013.01); *G06Q 30/0283* (2013.01); *G06Q 30/0611* (2013.01); *G06Q 30/0613* (2013.01); *H04L 51/02* (2013.01); *H04L 51/04* (2013.01); *H04L 51/046* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 7,596,509 B1* | 9/2009 | Bryson | ................. | G06Q 30/06 705/27.2 |
| 9,191,615 B1* | 11/2015 | Valimaki | ............. | H04L 12/1813 |
| 2014/0244404 A1* | 8/2014 | Manson | ............. | G06Q 30/0611 705/14.72 |
| 2016/0171576 A1* | 6/2016 | Dryden | .............. | G06Q 30/0611 705/80 |

OTHER PUBLICATIONS

Szirbik, Nick, Mediating Negotiations in a Virtual Enterprise via Mobile Agents, Jan. 1, 2000, Proceedings Academia/Industry Working COnference on Research Challenges, pp. 237-242 (Year: 2000).*

* cited by examiner

*Primary Examiner* — Michael Misiaszek
*Assistant Examiner* — Timothy J Kang
(74) *Attorney, Agent, or Firm* — Haynes and Boone LLP

(57) ABSTRACT

The method can determine that chat texts provided in a chat session by first and second chat application instances are directed to negotiation of a sale of an item. A recommended sale price for the item is generated based on the chat texts and item's current price. In response to determining to provide the recommended sale price to the first chat application instance, a third chat text can be transmitted, via the chat bot, to the chat session to cause a first UI of a user device hosting the first chat application instance to present the recommended sale price, and to cause the first UI to present a request for selection, from the first chat application instance, whether to transmit a fourth chat text to cause, in a second UI of a user device hosting the second chat application instance, a presentation of the recommended sale price.

20 Claims, 14 Drawing Sheets

COMMUNICATING IN CHAT SESSIONS USING CHAT BOTS TO PROVIDE REAL-TIME RECOMMENDATIONS FOR NEGOTIATIONS

BACKGROUND

Embodiments of the inventive subject matter generally relate to the field of communication systems and, more particularly, to communicating in chat sessions using chat bots.

Chat sessions facilitate communication between chat applications in a communication system. A user of a chat application can communicate, over a communication network, with a user of another chat application by transmitting communication to, and receiving communication from, the chat session. A chat bot can simulate a chat application to communicate with other chat applications using the chat session. The user can also have an account at a financial institution. However, the user cannot easily access his or her financial accounts from the chat session. If access to own financial account is tedious and overly complicated, that may discourage the user from using the chat session. Furthermore, conducting negotiations in the chat session is difficult due to the chat applications being distributed over the communication system.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
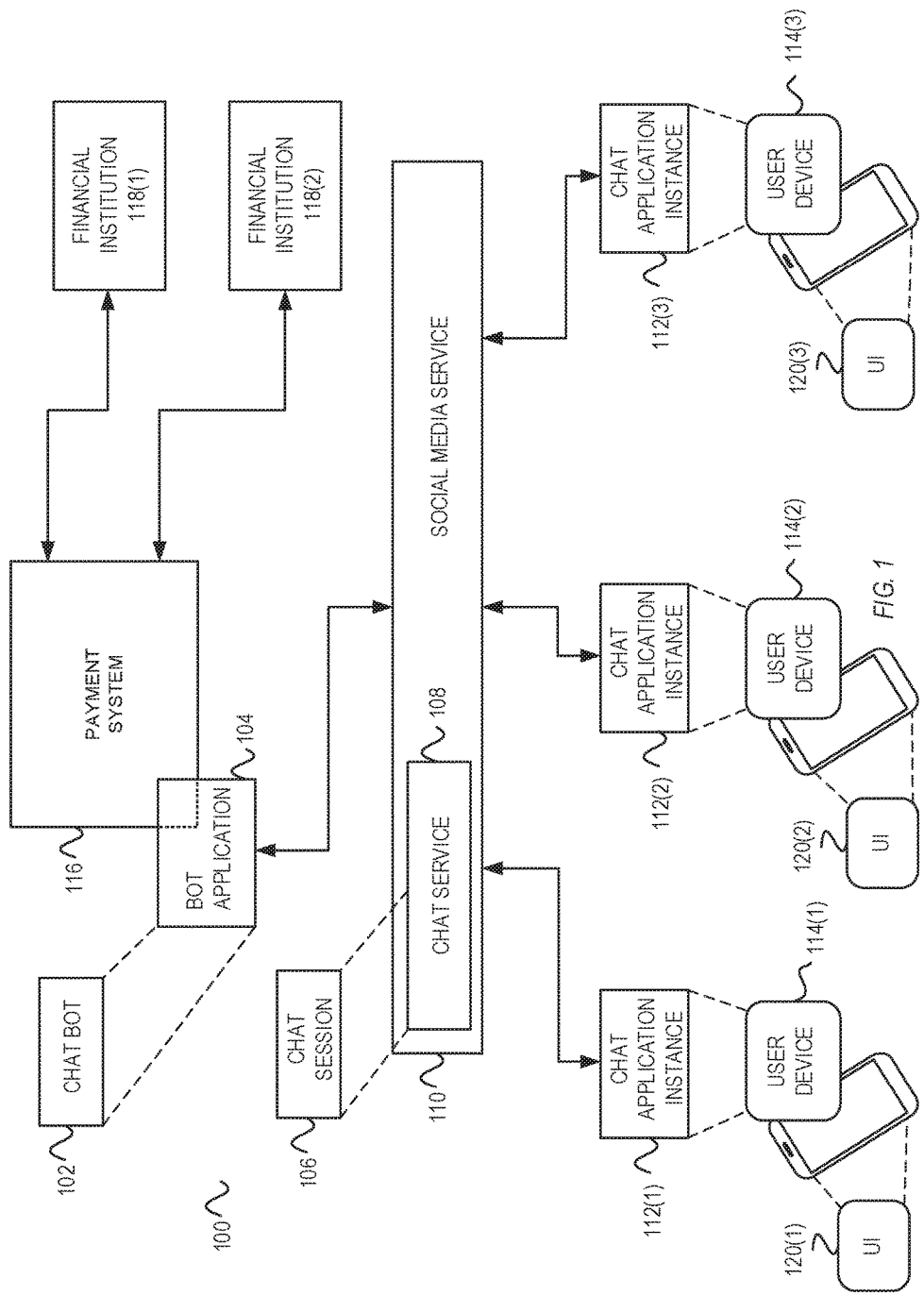
FIG. 1 is a system diagram illustrating embodiments of a communication system showing a bot application communicating using a chat session.

The description that follows includes exemplary systems, methods, techniques, instruction sequences and computer program products that embody techniques of the present inventive subject matter. However, it is understood that the described embodiments may be practiced without these specific details. For instance, although some examples refer to social media services, other types of media services are contemplated, such as online news services.

Chat sessions facilitate communication between instances of chat applications running on various devices in a communication system. A user of one instance of a chat application can communicate, over the communication system, with a user of another instance of a chat application by transmitting and receiving communication to/from the chat session. For example, the communication system facilitates the transmission of chat texts, over a communication network, between the instances of the chat applications and the chat session. The chat session, which can be hosted by a chat service, can facilitate communication between the multiple instances of the chat applications. Each chat application, such as a SLACK chat application, or a FACEBOOK MESSENGER application, can be hosted by a user device. In some cases, the communication may be between multiple instances of the same type of chat application. In other cases, the communication may involve instances of multiple different types of chat applications. The user device can be any type of a personal device such as a mobile phone, tablet, or other computing device.

Thus, multiple SLACK chat application instances can communicate with each other by transmitting chat texts to, and receive chat texts from, a SLACK chat session. The chat service can be a part of a social media service. For example, the chat service can be a SLACK chat service that is a part of a SLACK team collaboration tool, or a FACEBOOK MESSEGENGER chat service that is a part of a FACEBOOK social networking service. The chat service itself can be further hosted by a server or another type of a computing device.

A bot application can communicate, via a chat bot, with the chat session and simulate a chat application instance for communicating with the other chat application instances. For example, the bot application may simulate a SLACK chat application instance for communicating, via a SLACK chat session, with other SLACK chat application instances. The chat bot can send and receive chat texts from the chat session. However, with various forms of communication over the chat sessions, users of chat applications may find it tedious to transfer funds between each other. For example, a user of a first chat application instance in a chat session may not be able to easily transfer funds, over the communication network, to a user of a second chat application instance of that chat session. Users of chat applications may also find it tedious to negotiate with each other in real time using the chat session.

In some embodiments, the bot application can process financial transaction provided to the chat session from one or more chat application instances. For example, a chat application can provide chat text to the chat session, where the chat text indicates a financial transaction. The bot application can, via a chat bot, access this chat text and determine the financial transaction from the chat text. The financial transaction may indicate sending of funds from a payment account linked with a chat account for the chat application to another payment account. The bot application can determine whether the financial transaction can be performed. If the financial transaction can be performed, the bot application can, via the chat bot, transmit another chat text to the chat session, the another chat text indicating to the chat application instance that the financial transaction can be performed after expiration of a time-out period In some embodiments, the bot application can access payment accounts via chat sessions. The bot application can access, via the chat bot, a chat text that is provided in a chat session by a chat application instance. The chat application instance can be associated with a chat account. The bot application can access the chat text and determine whether to link the chat account with one of payment systems. If the bot application determines to link the chat account with one of the payment systems, the bot application then selects a certain payment system from the payment systems. The bot application can transmit, via the chat bot, another chat text to the chat session, the another chat text for causing a user interface of a user device that hosts the chat application instance to present a linking login. The linking login is for linking the chat account with a payment account of the selected payment system. The bot application can also receive commands from the chat session via the chat bot. The commands can be for a fund transfer from the payment account to another payment account that is linked with another chat account.

In some embodiments, the bot application can provide real-time recommendations for negotiations in chat sessions. The bot application can access, via the chat bot, a chat session and determine that a first chat text provided by a first chat application instance and a second chat text provided by a second chat application instance are both directed to negotiation of a sale of an item. Each user can use a chat application to communicate via the chat session, where a first chat application instance is hosted by a first user device, and a second chat application instance is hosted by the second user device. The bot application can calculate a recommended sale price for the item based on the chat texts and on a current sale price for the item as being negotiated in the chat session. The bot application can determine whether to provide the recommended sale price to the first chat application instance via the chat session. If the bot application determines to provide the recommended sale price, the bot application transmits, via the chat bot, a third chat text to the chat session. The third chat text is for causing a first user interface of the first user device to present the recommended sale price. The third chat text is also for causing the first user interface to present a request for selection, from a first user of the first chat application instance, whether the bot application is to transmit a fourth chat text for causing, in a second user interface of the second user device, a presentation of the recommended sale price. The following description, and associated Figures, illustrates various embodiments directed to the ideas listed above.

FIG. 1 is a system diagram 100 illustrating some embodiments of a communication system showing a bot application communicating using a chat session. In an overview of the system diagram 100, a chat bot 102 is hosted by a bot application 104. The bot application 104 communicates, via the chat bot 102, with a chat session 106. The chat session 106 is hosted by a chat service 108, which in turn is hosted by a social media service 110. Chat application instances 112(1)-112(3) (e.g., instances of the same type of chat application, instances of more than one type of chat application) can communicate with each other via the chat session 106. For example, the chat application instance 112(1) can transmit a chat text to the chat session 106 to the chat application instance 112(2) and/or the chat application instance 112(3). The chat bot 102 simulates a chat application instance when communicating with the chat application instances 112(1)-112(3). Each of the chat application instances 112(1)-112(3) may be hosted by a respective user device 114(1)-114(3). For example, the chat application instance 112(1) is hosted by the user device 114(1). Each of the user devices 114(1)-114(3) can also display a user interface (UI) 120(1)-120(3), respectively. Each of the UIs 120(1)-120(3) can display visual elements, such as chat texts of the chat session 106. Each of the UIs 120(1)-120(3) can also receive input from a user, such as a selection from a user. It is noted that each of the user devices 114(1)-114(3) can also receive input from a user via other input elements, such as via a keyboard, mouse, microphone (e.g., from a voice command), among others.

The bot application 104 can interface with a payment system 116 to provide instructions to the payment system 116 and receive financial information regarding users from the payment system 116. The payment system 116 can provide financial services, such as a fund transfer (e.g., a transfer of a certain monetary amount), to users. The payment system 116 can include payment accounts, each of which can be associated with a user. For example, a first user can be associated with a first payment account, and a second user can be associated with a second payment account at the payment system 116. The payment system 116 can facilitate the fund transfer from the first payment account to the second payment account. The payment system 116 can receive instructions from the bot application 104 to transfer money from a payment account that is linked with a first chat account (i.e., with a first user) to another payment account that is linked with another chat account (i.e., with another user). The payment system 116 can be implemented by PAYPAL or another online payment system that allows users to send, accept, and request fund transfers.

In the example illustrated in FIG. 1, the payment system 116 interfaces with one or more financial institutions, such as a financial institution 118(1) and a financial institution 118(2) (referred to collectively as financial institutions 118). Financial institutions 118 can provide financial services to users. Financial institutions 118 can be implemented as banks, credit unions, other deposit-taking institutions that accept and manage deposits and make loans, and other financial service providers. In some embodiments, financial institutions 118 can include credit card networks, e.g., for funding transfer of money between users. In some embodiments, financial institutions 118 may include a provider of purchasing power that is associated with a loyalty program. In one embodiment, the payment system 116 can access funds associated with the first payment account (of the payment system 116) by accessing the financial institution 118(1), and transfer these funds to a second payment account of the payment system 116 by accessing the financial institution 118(2).

In one embodiment, the bot application 104 can be implemented as a part of the payment system 116. For example, a server that hosts the payment system 116 can also host the bot application 104. The server can be implemented on a single computing device, or on multiple computing devices (e.g., using distributed computing devices or a cloud service). In another embodiment, the bot application 104 is separate from the payment system 116, e.g., as described below with reference to FIG. 2. The bot application 104 can include one or more modules, as described below with reference to FIG. 9. The bot application 104 can instantiate the chat bot 102, as well as other chat bots. The bot application 104 can access, via the chat bot 102, chat texts that are provided to the chat session 106 by the chat application instances 112. The bot application 104 can then determine any commands or financial transaction in the chat text. Depending on the content of the chat text, the bot application 104 can transmit, via the chat bot 102, another chat text to the chat session 106 or communicate with the payment system 116.

A service or an application (such as the bot application 104) can be hosted by a combination of software and hardware. It is noted that the same term "hosting" is used herein to describe both software hosting and hardware hosting. When software hosting, a software service such as the chat service 108, can instantiate and manage multiple chat sessions, such as the chat session 106 and other chat sessions. When hardware hosting, a computing device (such as a server or a user device) can provide resources such as memory, communication, and execution resources for execution of instructions.

The bot application 104 can access, via the chat bot 102, chat text in the chat session 106. The chat text can be provided to the chat session 106 from the chat application instance 112(1). The chat application instance 112(1) can be associated with a first chat account, and the chat application instance 112(2) can be associated with a second chat account. The bot application 104 can then determine a financial transaction from the chat text. The financial transaction may indicate sending of funds from a first payment account linked with the first chat account to a second payment account linked with the second chat account. The first and second payment accounts can be accounts at the payment system 116.

A payment account may be linked with a chat account when the bot application 104 includes an association between the chat account at the chat service 108, and the payment account at the payment system 116, both for the same user. In one embodiment, a payment account is linked with a chat account when the bot application 104 can also access configuration information for the chat account at the chat service 108 and/or for the payment account at the payment system 116, both for the same user. For a fund transfer between users of user devices 114(1) and 114(2), the bot application 104 can access linked chat and payment accounts for both users.

The bot application 104 can also determine that the chat text indicates that a negotiation is taking place between users of the chat application instances 112(1) and 112(2). If the chat text indicates a financial transaction, the bot application 104 can then determine whether that financial transaction can be performed. If the financial transaction can be performed, the bot application 104 can transmit, via the chat bot 102, a chat text to the chat session 106 to indicate to the chat application instance 112(1) that the financial transaction can be performed. If the financial transaction cannot be performed, the bot application 104 can transmit, via the chat bot 102, a chat text to the chat session 106 to indicate, to the chat application instance 112(1), that the financial transaction cannot be performed. The bot application 104 can communicate with the payment system 116 to perform additional processing so the financial transaction can be performed.

In one embodiment, the bot application 104 can transmit, via the chat bot 102, a chat text to the chat session 106 to indicate to the chat application instance 112(1) that the financial transaction will be performed after an expiration of a time-out period. The bot application 104 can, in response to expiration of the time-out period, perform the financial transaction. The bot application 104 can communicate with the payment system 116 to perform the financial transaction. For example, the bot application 104 can send instructions to the payment system 116 to send the funds from the payment account linked with the chat account to another payment account. The another payment account can be linked with a chat account of another chat application instance 112(2).

In another embodiment, the bot application 104 can send instructions for performing the financial transaction to the payment system 116. The payment system 116 may receive a plurality of instructions from a plurality of bot applications, including the bot application 104. The payment system 116 may then queue the plurality of instructions and perform the corresponding queued financial transactions at a later point in time. For example, the payment system 116 may perform the queued financial transactions when a certain number of instructions are in the queue. In one embodiment, the bot application 104 can queue the instructions, and then send the instructions to the payment system 116. The bot application 104 can be used in related embodiments, such as where there are multiple chat sessions. Such embodiments are described below with regard to FIG. 2.

Figure 2:
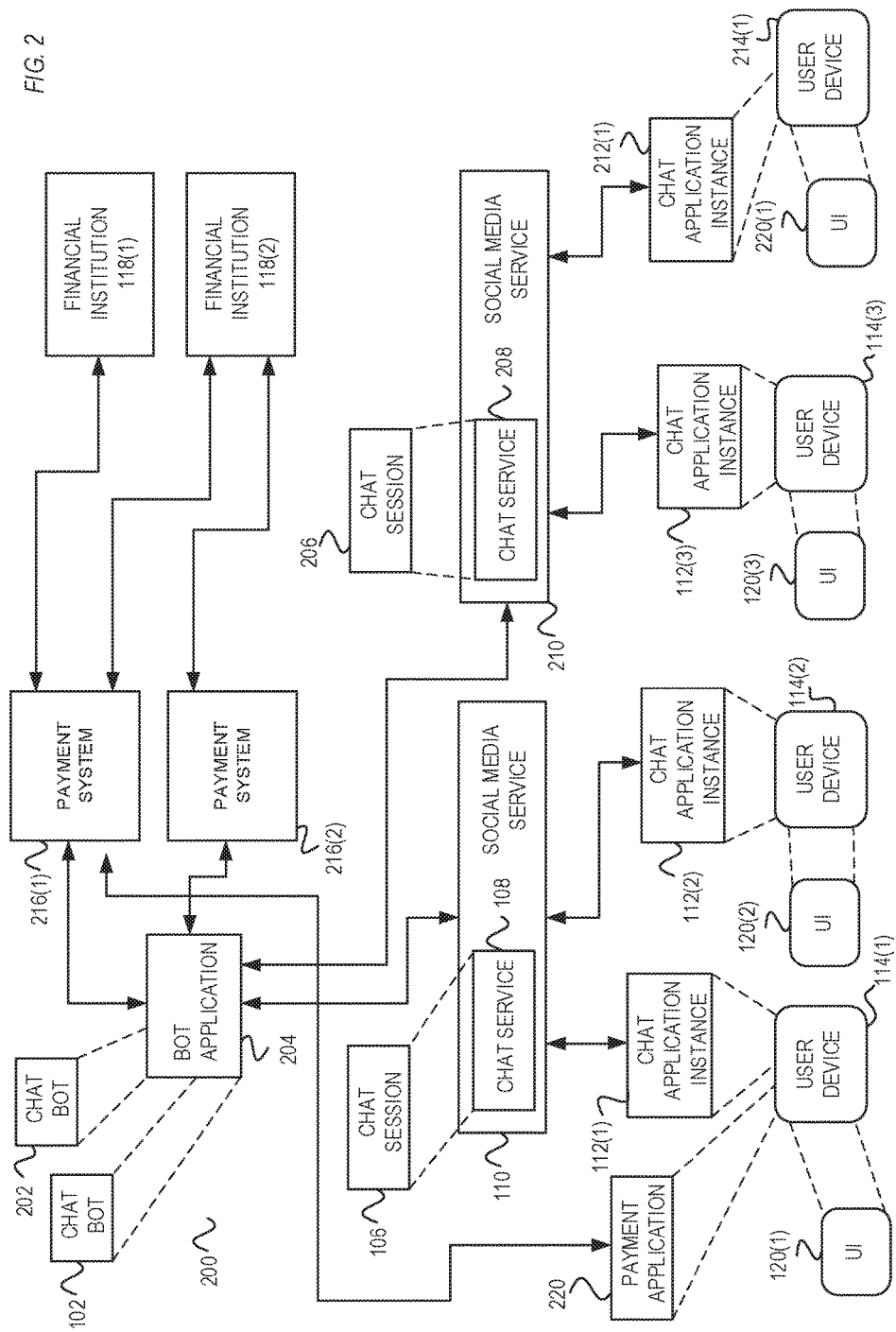
FIG. 2 is a system diagram illustrating embodiments of a communication system showing bot applications communicating using chat sessions.

FIG. 2 is a system diagram 200 illustrating some embodiments of a communication system showing bot applications communicating using chat sessions. The system diagram 200 is similar to the system diagram 100, with some variations to illustrate different embodiments or different aspects of the same embodiments.

In an overview of the system diagram 200, chat bots 102 and 202 are hosted by a bot application 204. The bot application 204 can communicate, via the chat bot 102, with the chat application instances 112(1) and 112(1) over the chat session 106. The bot application 204 can also communicate, via the chat bot 202, with chat application instances 212(1) and 212(2) over a chat session 206. Similar to that shown in FIG. 1, the chat session 106 is hosted by a chat service 108, which in turn is hosted by a social media service 110. FIG. 2 also illustrates a chat session 206 that is hosted by a chat service 208, which in turn is hosted by a social media service 210.

The bot application 204 can interface with a payment system 216(1) and with a payment system 216(2). Each of the payment systems 216(1) and 216(2) can provide financial services, such as for a fund transfer, to users. Each of the payment systems 216(1) and 216(2) can include payment accounts, each of which can be associated with a user. For example, a first user can be associated with a first payment account of the payment system 216(1), and a second user can be associated with a second payment account of the payment system 216(2). The bot application 204 can instruct the payment system 216(1) to transfer funds from the first payment account to the second payment account.

Thus, in some embodiments the payment systems 216(1) and 216(2) can each facilitate a fund transfer (e.g., a transfer of money) from the first payment account to the second payment account. Each of the payment systems 216(1) and 216(2) may be able to receive instructions from the bot application 104 to transfer money from a payment account that is linked with a first chat account (i.e., with a first user) to another payment account that is linked with another chat account (i.e., with another user). The payment systems 216(1) and 216(2) can be different from each other by the way each payment system provides payment accounts, a fee or percentage that is charged per financial transaction for the user, or by a type of financial institution that can be used. The payment systems 216(1) and 216(2) can differ in how each payment system calculates risk of each financial transaction and/or user. The payment systems 216(1) and 216(2) can also differ in whether each payment system allows transfer of funds across country boundaries, or how currency conversions are performed.

In some embodiments, the bot application 204 can determine which payment system to use for a given financial transaction, chat application instance, and/or user. The bot application 204 can determine which one of the payment systems 216(1) or 216(2) to use based on several financial characteristics such as, for example, a fee or percentage that is charged per financial transaction for the user, a type of financial institution that can be used for a pending financial transaction, or for a risk threshold that is required for a given financial transaction or a user. In other situations, the bot application 204 can select a certain payment system based on whether the other user (e.g. a recipient) in a financial transaction has a payment account with that payment system.

For example, the payment system 216(1) can have higher transaction fees than the payment system 216(2), but also allow cross-border fund transfer (e.g., between U.S.A. and Germany). The payment system 216(2) can have lower transaction fees than the payment system 216(1), but it does not allow cross-border fund transfer for countries involved in a financial transaction indicated by two users (e.g., does not allow fund transfer between U.S.A. and Germany). In this case, the bot application 204 would determine to use the payment system 216(1), regardless of the higher fees. In another example, the risk assessment for the payment system 216(1) does not allow a fund transfer to a certain user, whereas the risk assessment for the payment system 216(2) allows a fund transfer to a certain user. The bot application 204 can determine, e.g., by accessing historical information of previous financial transaction attempts, or by communicating with each payment system regarding each user, whether each payment system allows fund transfers for that user.

The user device 114(1) hosts the chat application instance 212(2) and a payment application 220. The payment application 220 communicates with the payment system 216(1) directly. In one embodiment, the bot application 204 provides, via the chat bot 102, a chat text to the chat session 106. The chat text can prompt the user device 114(3) to sends instructions to the payment system 216(1) to perform the financial transaction.

The bot application 204 can access, via the chat bot 102, a chat text that is provided in a chat session by the chat application instance 112(1). The chat application instance 112(1) can be associated with a first chat account. The first chat account can correspond to a first account of a user of the user device 114(1). Similarly, the chat application instance 112(2) can be associated with a second chat account that corresponds to an account of a user of the user device 114(2) (referred to herein as the second account of the second user).

The bot application 204 can determine, based on the chat text, whether to link the chat account with one of payment systems. If the bot application 204 determines to link the chat account with one of the payment systems, the chat application instance 204 can then select the payment system 216(1) from various available payment systems. Alternatively, the bot application 204 can determine not to link the chat account with one of the payment systems.

The chat application instance 204 can select the payment system 216(1) from various available payment systems for linking the chat account with a payment system. The selection of the payment system 216(1) instead of the payment system 216(2) can be made based on a variety of financial characteristics, as described above. Once the chat application instance 204 selects the payment system 216(1) for linking, the chat application instance 204 can transmit, via the chat bot 102, another chat text to the chat session 106. The another chat text can cause the UI 120(1) of the user device 114(1) to present a linking login for linking the chat account with a payment account of the selected payment system 216(1). Once the accounts are linked, both the chat account and the payment account can be associated with the user device 114(1), or with the user of the user device 114(1). The bot application 204 can also receive commands, via chat texts from the chat session 106, from the chat application instance 112(1) for fund transfer from the payment account to another payment account that is linked with another chat account.

In some embodiments, the bot application 204 can also provide real-time recommendations for negotiations that are conducted in the chat session 106 between chat application instances 112(1) and 112(2). For example, users of chat application instances 112(1) and 112(2) can negotiate a price for sale of a bicycle. Each of the chat application instances 112(1) and 112(2) can transmit and receive chat texts to/from the chat session 106. The bot application 204 can access, via the chat bot 102, these chat texts in the chat session 106. The bot application 204 can determine whether a first chat text provided to the chat session 106 by the first chat application instance 112(1) and a second chat text provided to the chat session 106 by the second chat application instance 112(2) are both directed to negotiation of a sale of an item, such as the bicycle.

Similarly, the bot application 204 can in some embodiments access chat texts related to negotiations in other chat sessions. For example, the bot application 204 can access, via the chat bot 202, the chat texts provided to the chat session 206. In the chat session 206, users of chat application instances 112(3) and 212(1) can negotiate a price for sale of another bicycle. The bot application 204 can similarly determine whether the chat texts provided to the chat session 206 are both directed to negotiation of sale of another bicycle. The bot application 204 can determine that the negotiations for sale in chat sessions 106 and 206 are directed to two items of the same type, e.g., two bicycles.

In some embodiments, the bot application 204 can calculate a recommended sale price for the item (e.g., for the bicycle) based on the chat texts and on a current sale price for the item being negotiated in the chat session 106. The bot application 204 can determine whether to provide the recommended sale price to the chat application instance 112(1) in the chat session 106. If the bot application 204 determines to provide the recommended sale price, the bot application 204 can transmit, via the chat bot 102, another chat text to the chat session 106. The another chat text is directed to the chat application instance 112(1) and is for causing the UI 120(1) to present the recommended sale price. The third chat text is also for causing the UI 120(1) to present a request for selection, from a first user of the chat application instance 112(1), whether the chat application instance 204 is to present, in the UI 120(2), the recommended sale price. The chat application instance 204 can transmit, via the chat bot 102, a fourth chat text to the chat session 106 for causing the UI 120(2) to present the recommended sale price.

The bot application 204 can, in some embodiments, also determine another sale price that is currently being negotiated in the chat session 206. The bot application can determine to transmit chat texts that are directed to one or both of the chat application instances 112(1) and 112(2) to display the another sale price being negotiated. The bot application 204 is configured to access the chat sessions 106 and 206 substantially in parallel, i.e., simultaneously. As chat application instances 112(1)-112(3) and 212(1) can be distributed over a large geographical area, the chat sessions 106 and 206 allow these chat application instances to communicate with each other, such as to conduct negotiations. The bot application 204 can access the chat texts that are sent by the various chat application instances, and provide recommendations, in real-time, for these negotiations.

Figure 3:
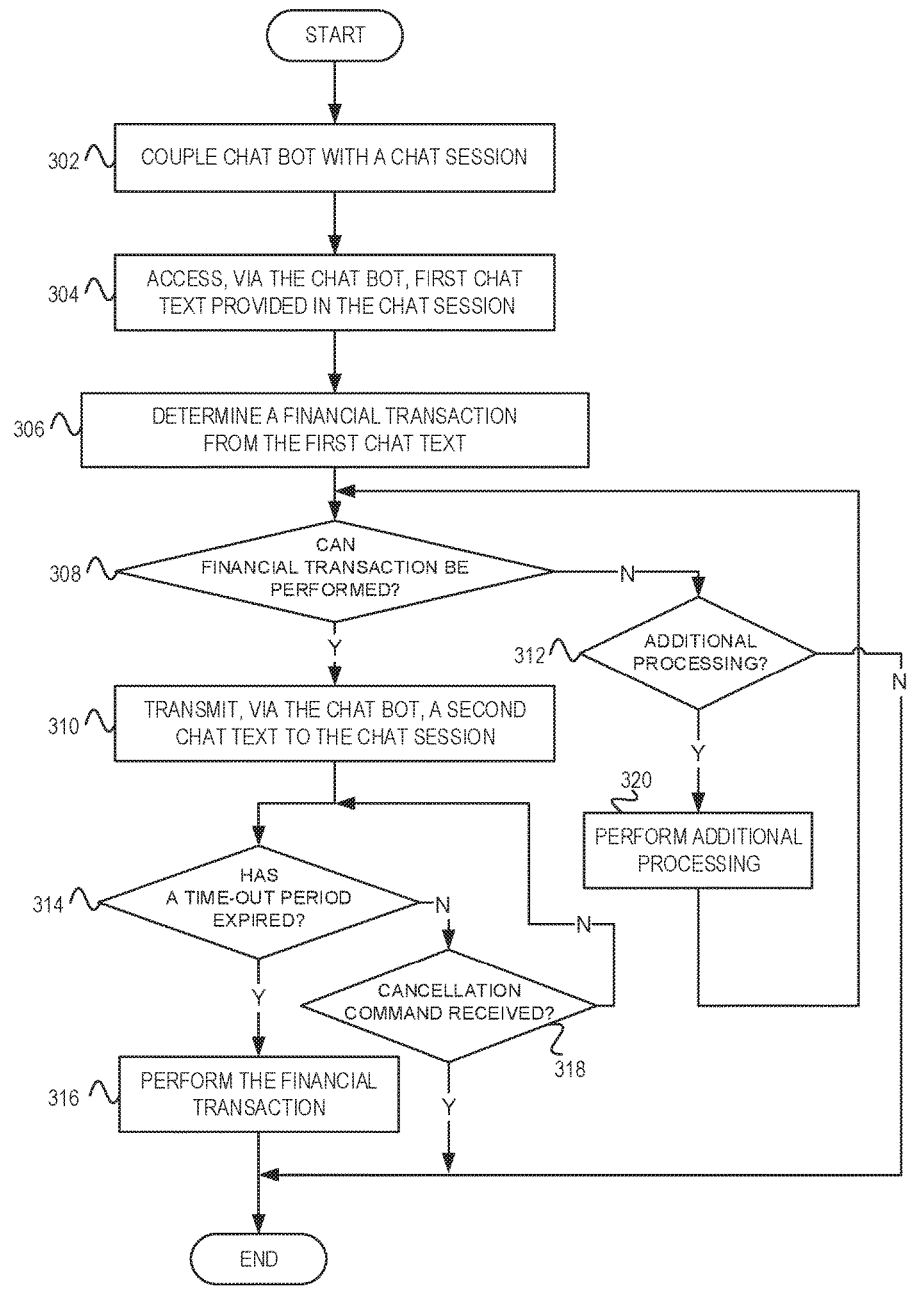
FIGS. 3 and 4 are flow diagrams illustrating embodiments of operations for accessing financial transactions via bot applications.

FIG. 3 show a flow diagram 300 illustrating exemplary operations for accessing financial transactions via bot applications. The method of FIG. 3 is described with reference to the systems and components described in FIGS. 1 and 2 (for illustration purposes and not as a limitation). The example operations can be carried out by the bot application 104 or by bot application 204.

Beginning with 302, a chat bot is coupled with a chat session. For example, the chat bot 102 can be coupled with the chat session 106. In some cases, multiple chat bots can be coupled with multiple chat sessions. For example, the chat bot 202 can also couple with the chat session 206. Coupling of a chat bot with a chat session can include registering with a chat session and configuring the chat bot for communication using the chat session.

At 304, the bot application accesses, via the chat bot, a first chat text provided in the chat session. For example, the bot application 104 can access, via the chat bot 102, the chat text provided in the chat session 106. In some cases where the bot application 104 is coupled to multiple chat sessions 106 and 206, the bot application 204 can access, via the chat bot 102, a chat text provided in the chat session 106, as well as access, via the chat bot 202, another chat text provided in the chat session 206. In one embodiment, the first chat text is accessible (e.g., readable) by the chat application instance 112(1) but not by the chat application instance 112(2). In some embodiments, the first chat text is accessible by both the chat application instance 112(1) and the chat application instance 112(2).

At 306, the bot application determines a financial transaction from the first chat text. For example, the bot application 104 can determine a type of the financial transaction, including whether the financial transaction is for fund transfer, for receiving funds, for a request of funds, or a miscellaneous transaction. In some embodiments, the determination of a financial transaction may be accomplished based on recognition of particular characters, words, phrases, patterns, emojis, or other symbols within the chat text. A financial transaction for fund transfer may indicate to transfer funds (i.e., of some monetary value) from a first user's account at the payment system 116 (referred to as a payment account) to a second user's account at the payment system 116. A financial transaction for receiving funds may indicate to receive funds at the first user's payment account from the second user's payment account. A financial transaction for a request of a transfer of funds may indicate sending a request to the second user to prompt that second user to transfer funds from the second user's payment account to the first user's payment account. Miscellaneous transaction may include checking user's balance at the payment system 116 (e.g., at the first user's payment account). Miscellaneous transaction may include initiating requests of transfers for transfer of funds that are transmitted to chat sessions 106 and 206 to split a single payment among these the payment accounts linked with chat application instances 112(1)-112(3) and 212(1).

At 308, the bot application determines whether the financial transaction can be performed. This determination can depend on the type of financial transaction. This determination can also depend on the amount of funds indicated by the financial transaction, on whether the chat account(s) of user(s) involved in the financial transaction are linked with payment account(s), on results of risk analysis for the financial transaction and/or the user(s) involved in the financial transaction, on determination of whether the financial transaction would comply with regulatory requirements, among others. If the financial transaction can be performed, the flow proceeds to 310. If the financial transaction cannot be performed, the flow proceeds to 312.

The financial transaction can involve a transfer of funds between payment accounts associated with chat application instances 112(1) and 112(2). The bot application 104 can then determine whether a first payment account is linked with the chat account of the chat application instance 112(1), as well as whether a second payment account is linked with the chat account of the chat application instance 112(2). The bot application 104 can communicate with the payment system 116 to determine whether the financial transaction satisfies regulatory requirements.

In some embodiments, the bot application 104 can also determine risk levels for payment accounts associated with the financial transaction. The bot application 104 can thus determine a first risk level for the first payment account that is linked with the first chat account. The bot application 104 in some embodiments can also determine a second risk level for the second payment account that is linked with the second chat account. The bot application 104 can also determine whether the first risk level and the second risk level satisfy risk requirements. In one embodiment, the payment system 116 can instead perform the risk analysis and threshold comparison for both payment accounts. In this case, the payment system 116 can indicate to the bot application 104 whether the risk levels of the payment accounts satisfy the risk requirements.

At 310, the bot application transmits, via the chat bot, a second chat text to the chat session. For example, the bot application 104 can transmit, via the chat bot 102, a second chat text to the chat session 106. The second chat text can indicate, to the chat application instance 112(1), that the financial transaction will be performed after an expiration of a time-out period. For example, the second chat text can indicate that a financial transaction for a transfer of funds a payment account associated with a user of the user device 114(1) will be performed automatically after a certain time-out expires. Duration of the time-out may be preconfigured, such as by the user or determined based on the financial transaction. The second chat text can also indicate that the user can input a cancellation command during the time-out period, such as via the UI 120(1).

At 312, the bot application determines whether to perform any additional processing. For example, the bot application 104 can determine whether to perform additional processing that would link a chat account of the chat application instance 112(1) with a payment account at the payment system 116. The additional processing may also include allowing the user to add funds or financing options to the user's payment account, e.g., in event that a current status of the user's payment account shows insufficient funds. The additional processing can also include authentication of the user, e.g., in event that the user of the chat application instance 112(1) is not properly verified. If the additional processing should be performed, the flow proceeds to 320. If the financial transaction cannot be performed, the flow ends.

At 314, the bot application determines whether the time-out period has expired. If the time-out period has expired, flow continues to 316. If the time-out period has not expired, the flow continues to 318.

At 316, the bot application performs the financial transaction. For example, the bot application 104 can send instructions to the payment system 116 to perform the financial transaction. The bot application 104 can transmit, via the chat bot 102, another chat text to the chat session 106. The another chat text can indicate the status of the financial transaction. For example, the financial transaction may be queued up at the payment system 116, and the another chat text can indicate, to the bot application 104, a wait associated with the queued up status of the financial transaction.

If the financial transaction is for sending funds, the bot application 104 can in some embodiments determine whether a first monetary amount can be sent from the first payment account to the second payment account. If the first monetary amount can be sent from the first payment account to the second payment account, the bot application 104 can instruct the payment system 116 to send the first monetary amount from the first payment account to the second payment account. If the financial transaction is for receiving funds, the bot application 104 can in some embodiments determine whether the first monetary amount can be received by the first payment account from the second payment account. If the first monetary amount can be received by the first payment account from the second payment account, the bot application 104 can instruct the payment system 116 to send the first monetary amount from the second payment account to the first payment account.

If the financial transaction is for requesting a fund transfer, the bot application 104 can in some embodiments determine a target of the request for the fund transfer of a first monetary amount. If the target is the second chat application instance 112(2), the bot application 104 can transmit, via the chat bot 102, a third chat text to the chat session 106. The third chat text can indicate to the chat application instance 112(2) the request for the fund transfer of the first monetary amount. In one embodiment, the third chat text is accessible (e.g., available for display on the UI 120 (2)) by the chat application instance 112(2) but not by the chat application instance 112(1). In another embodiment, the third chat text is accessible by both chat application instances 112(1) and 112(2). The bot application 104 can also determine whether the first monetary amount is transferred from the second payment account to the first payment account, i.e., in response to the request for the fund transfer.

At 318, the bot application can determine whether a cancellation command was received. For example, the bot application 104 can determine whether a cancellation command was received from the chat application instance 112(1) via the chat session 106.

At 320, the bot application 104 performs additional processing. For example, the bot application 104 can link a chat account of the chat application instance 112(1) with a payment account at the payment system 116. As another example, the bot application 104 can also allow the user to add funds or financing options to the user's payment account. The bot application 104 can also authenticate the user. The bot application 104 can also indicate, via the another chat text, that the financial transaction requires additional processing.

Figure 4:
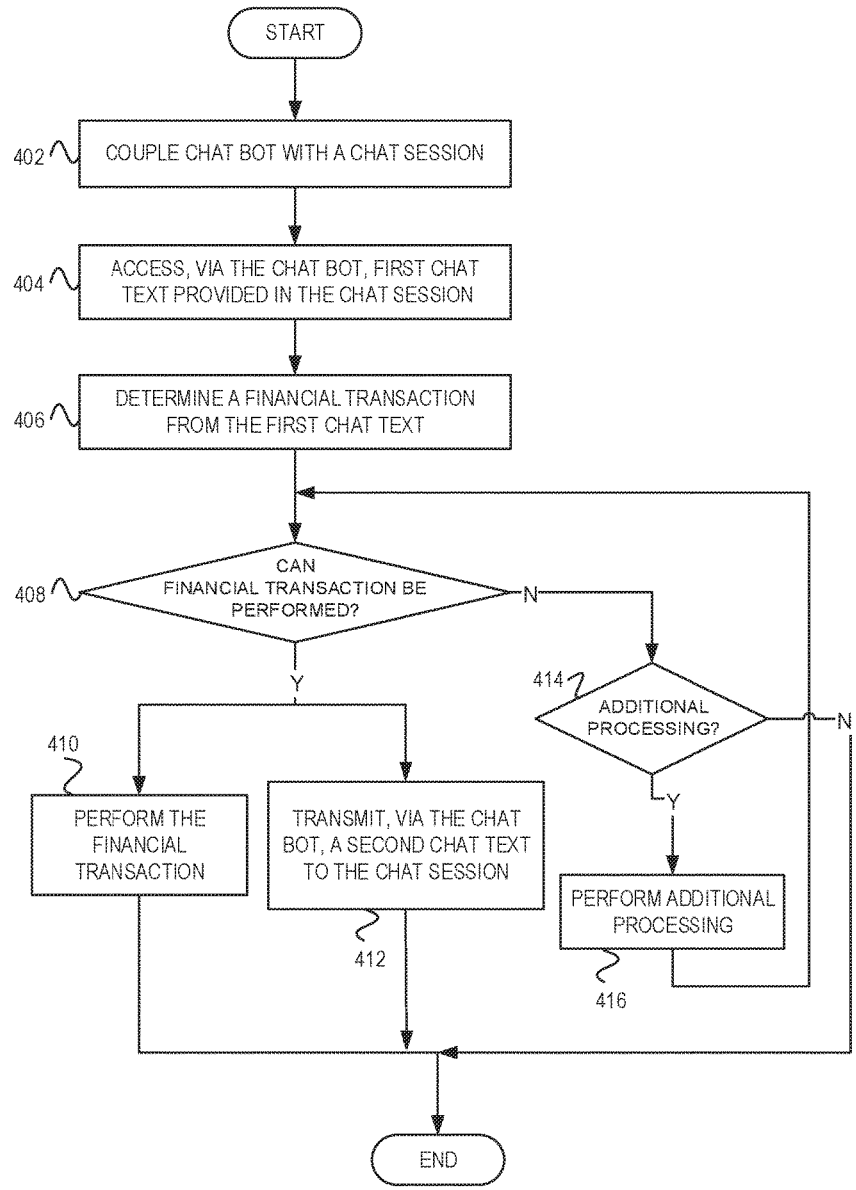

FIG. 4 show a flow diagram 400 illustrating exemplary operations for accessing financial transactions via bot applications. The method of FIG. 4 is described with reference to the systems and components described in FIGS. 1 and 2 (for illustration purposes and not as a limitation). The example operations can be carried out by the bot application 104. The method of FIG. 4 is similar to that shown by FIG. 3, with some variations to illustrate different embodiments, or different aspects of particular embodiments.

At 402, a chat bot is coupled with a chat session. The element 402 of FIG. 4 is similar to the element 302 of FIG. 3. At 404, the bot application can access, via the chat bot, a first chat text provided in the chat session. The element 404 of FIG. 4 is similar to the element 304 of FIG. 3. At 406, the bot application can determine a financial transaction from the first chat text. The element 406 of FIG. 4 is similar to the element 306 of FIG. 3.

At 408, the bot application determines whether the financial transaction can be performed. The determination of 408 of FIG. 4 is similar to the determination of 308 of FIG. 3. If the financial transaction can be performed, the flow proceeds to 410 and to 412. If the financial transaction cannot be performed, the flow proceeds to 414. Elements 410 and 412 can be performed independently of each other. At 410, the bot application can perform the financial transaction.

At 412, the bot application can in some embodiments transmit, via the chat bot, a second chat text to the chat session. For example, the bot application 104 can transmit, via the chat bot 102, a second chat text to the chat session 106. The second chat text can indicate, to the chat application instance 112(1), that the financial transaction will be performed.

In one embodiment, the timing of element 410 might be asynchronous. The element 410 can be performed at some point in time, e.g., as scheduled or determined by the bot application 104. The element 410 of FIG. 4 may be similar to the element 316 of FIG. 3. In another embodiment, the bot application 104 can send instructions to the payment system 116 to perform the financial transaction. However, the payment system 116 may perform the financial transaction at a later time, such as a batch operation performed when a certain number of financial transactions are in a queue.

At 414, the bot application can determine whether the financial transaction can be performed. The determination of 414 of FIG. 4 is similar to the determination of 312 of FIG. 3. If the additional processing can be performed, the flow proceeds to 416. If the additional processing cannot be performed, the flow ends. At 416, the bot application can perform the additional processing. The element 416 is similar to that of element 320 of FIG. 3.

Figure 5:
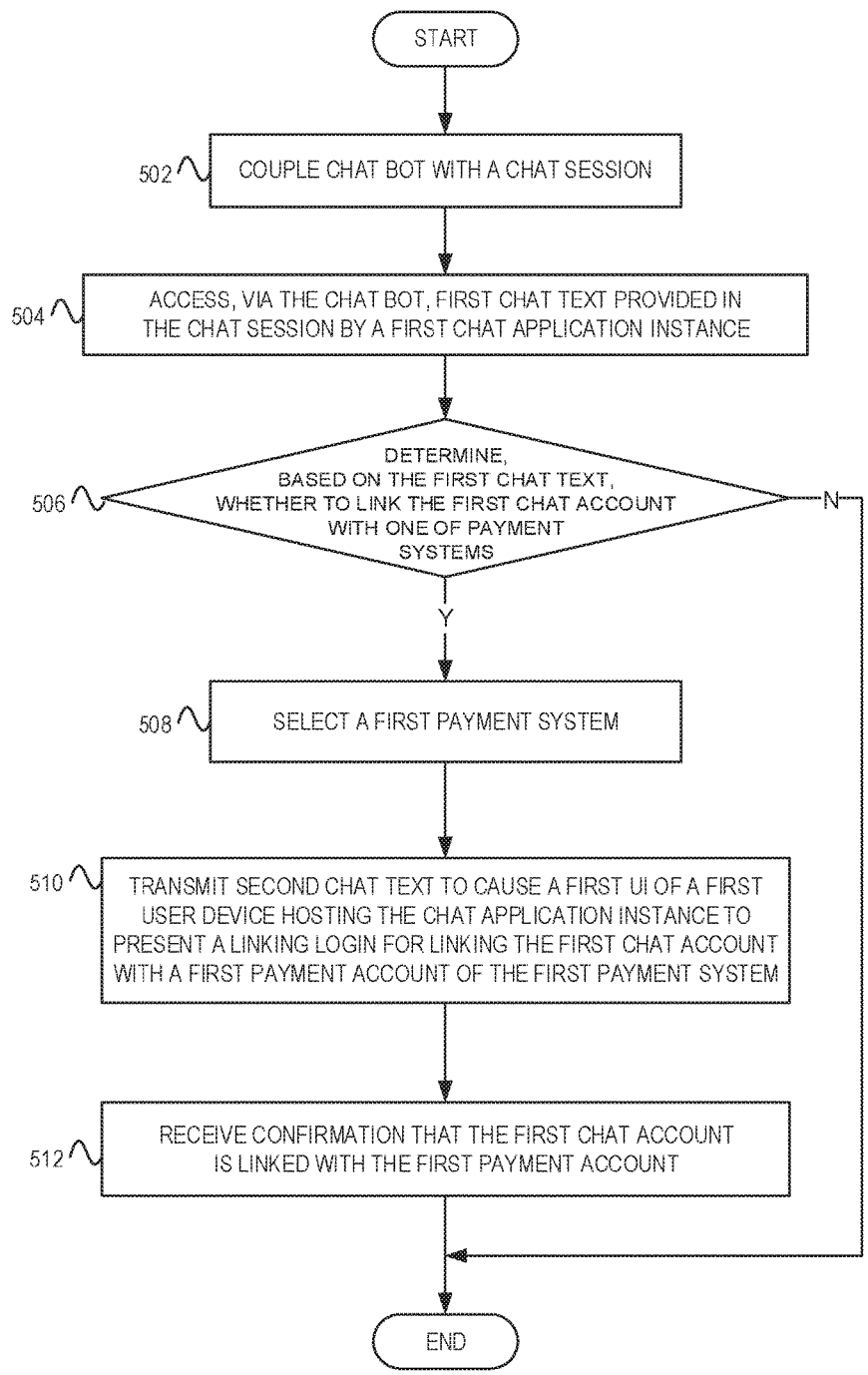
FIG. 5 is a flow diagram illustrating one embodiment of operations for accessing payment accounts via bot applications.

FIG. 5 is a flow diagram illustrating exemplary operations for accessing payment accounts via bot applications. The method of FIG. 5 is described with reference to the systems and components described in FIGS. 1 and 2 (for illustration purposes and not as a limitation). The example operations can be carried out by the bot application 104 or by the bot application 204.

At 502, a chat bot is coupled with a chat session. The element 502 of FIG. 5 is similar to the element 302 of FIG. 3. At 504, the bot application can access, via the chat bot, a first chat text provided in the chat session. The element 504 of FIG. 5 is similar to the element 304 of FIG. 3.

At 506, the bot application determines, based on the first chat text, whether to link the first chat account with one of payment systems. For example, the bot application 204 can determine that the first chat text indicates a financial transaction with the another chat account, such as a fund transfer transaction. The bot application 204 can in some embodiments also determine that the financial transaction requires that the first chat account is linked with the first payment system for that financial transaction. In another embodiment, the bot application 204 determines that the first chat text indicates a command to link the first chat account with the first payment account. If the bot application determines to link the first chat account with one of payment systems, the flow proceeds to 508. If the bot application determines not to link the first chat account with one of payment systems, the flow ends.

At 508, the bot application selects a first payment system. For example, the bot application 204 can select the payment system 116, such as when the bot application 204 is implemented as a part of the payment system 116. In another example, the bot 204 application can select a payment system of the payment systems 216(1) and 216(2). Each of the payment systems 216(1) and 216(2) of FIG. 2 can provide financial services to users, such as fund transfers. As discussed above with reference to FIG. 2, the bot application 204 can select which of the payment systems 216(1) or 216(2) to use. The bot application 204 can select the payment system based on several financial characteristics, such as, a fee or percentage that is charged per financial transaction for the user, a type of financial institution that can be used for a pending financial transaction, or a value of a risk threshold for that payment system that is required for anticipated financial transaction or a user.

At 510, the bot application transmits, via the chat bot, a second chat text to the chat session. The second chat text in some embodiments is for causing a first user interface of a first user device hosting the first chat application instance to present a linking login, the linking login for linking the first chat account with a first payment account of the first payment system. For example, the bot application 204 can transmit, via the chat bot 102, a second chat text to the chat session 106. The second chat text in some embodiments is for causing the UI 120(1) to present a linking login (e.g., such as described with reference to FIG. 11), for linking the chat account of the user of user device 114(1) with a payment account at the payment system 116 for the user. The second chat text can include instructions that are executable by the social media service 110 to cause the UI 120(1) to display the linking login. The second chat text can include instructions that are executable by the user device 114(1) to present a linking login for the payment system 116.

At 512, the bot application receives a confirmation that the first chat account is linked with the first payment account. The chat bot may be configured to receive commands, via the chat session, from the first chat application instance for a fund transfer from the first payment account to another payment account linked with another chat account. For example, the bot application 204 receives a conformation from the payment system 116 that the first chat account for the chat application instance 112(1) is linked with the payment system 116. In response to receiving the confirmation, the bot application 204 may be configured to receive, via the chat bot 102, to receive commands from the first chat application instance 112(1) in the chat session 106 for a fund transfer. The fund transfer can be from the first payment account to another payment account linked with another chat account.

For example, the bot application 204 can in some embodiments access, via the chat bot 102, a third chat text provided to the chat session 106 by the chat application instance 112(1). From the third chat text, the bot application 204 can determine to perform a fund transfer of a first monetary amount from the first payment account to a payment account of a second chat account for the chat application instance 112(2). The bot application 204 can determine whether the second chat account is linked with the payment system 216(1) or 216(2).

If the bot application 204 determines that the second chat account is not linked with a payment system, the bot application 204 can in some embodiments select the payment system 216(1) for linking. The bot application 204 can transmit, via the chat bot 102, a fourth chat text to the chat session 106. The fourth chat text is for causing the US 120(2) to present another linking login. The another linking login is for linking the second chat account with a second payment account of the payment system 216(1). The bot application 204 can delay sending instructions for the financial to the payment system 216(1) until the second chat account is linked to the payment system 216(1).

If the bot application 204 determines that the second payment account cannot be linked with the second chat account, some embodiments of the bot application can take one or more actions, as described below. For example, if the second payment account cannot be linked with the second chat account, the bot application 204 can transmit, via the chat bot 102, a chat text to the chat session 106. This chat text can indicate to the first chat application instance 112(1) that the second payment account cannot be linked with the second chat account. If the second payment account cannot be linked with the second chat account, the bot application 204 can cancel the fund transfer from the first payment account to the second payment account at the payment system 216(1). If the second payment account cannot be linked with the second chat account, the bot application 204 can transmit, via the chat bot 102, another chat text to the chat session. This chat text can cause the UI 120(1) to present a request for selection of a payment application for a direct transfer of the first monetary amount to the second payment account. For example, the user can select the payment application 220 for a direct transfer of the first monetary amount to the second payment account of the payment system 216(1).

Once the bot application 204 receives a confirmation that the first chat account is linked to the first payment account, some embodiments of the bot application 204 can transmit, via the chat bot 102, another chat text to the chat session 106. This chat text can cause the UI 120(1) to present a request for selection of a threshold for a maximum amount of money that can be transferred without requiring a receipt of user confirmation. An example of the linking process via the UI 120(1) is shown below with reference to FIG. 11.

Figure 6:
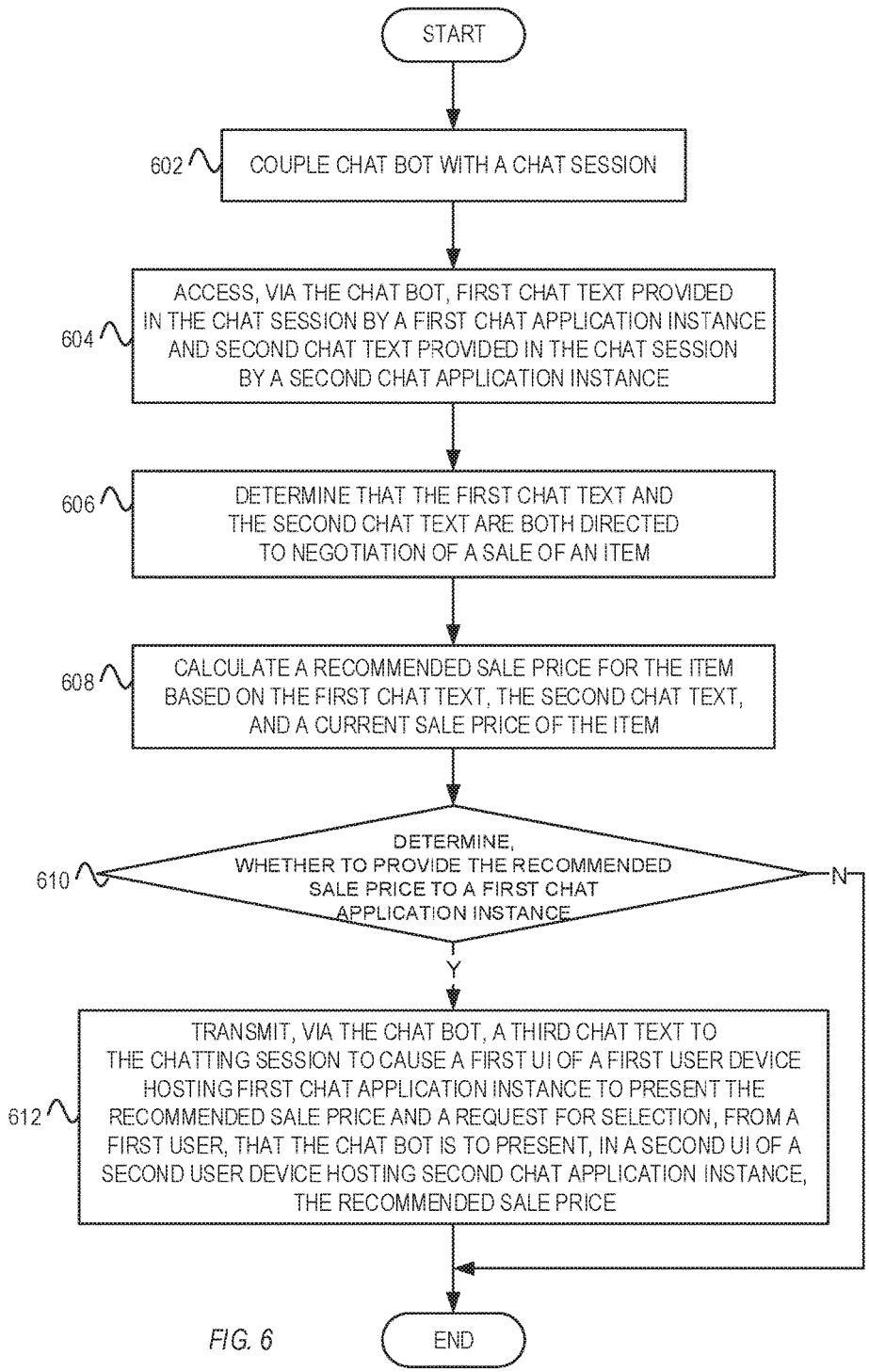
FIG. 6 is a flow diagram illustrating one embodiment of operations for providing real-time recommendations for negotiations in chat sessions via bot applications.

FIG. 6 is a flow diagram illustrating exemplary operations for providing real-time recommendations for negotiations in chat sessions via bot applications. The method of FIG. 6 is described with reference to the systems and components described in FIG. 2 (for illustration purposes and not as a limitation). The example operations can be carried out by the bot application 204.

At 602, a chat bot couples with a chat session. The element 602 of FIG. 6 is similar to the element 302 of FIG. 3. At 604, the bot application can in some embodiments access, via the chat bot, a first chat text provided in the chat session by a first chat application instance and a second chat text provided in the chat session by a second chat application instance. For example, the bot application 204 can access, via the chat bot 102, chat texts provided in the chat session 106 by the chat application instance 112(1) and by the chat application instance 112(2).

At 606, the bot application determines in some embodiments that a first chat text provided in a first chat session by a first chat application instance and a second chat application instance are directed to negotiation of a sale of an item. For example, the bot application 204 can determine that that both of the chat texts of 602 are directed to negotiation of a sale of a bicycle.

At 608, the bot application calculates a recommended sale price to the item based on the first chat text, the second chat text, and a current sale price of the item. For example, the bot application 204 can calculate a recommended sale price for the bicycle based on both of the chat texts as well on a current sale price for the item as being negotiated in the chat session. The bot application 204 can in some embodiments calculate the recommended sale price by a sale price at which the first user and the second user will agree to complete the sale of the bicycle. The bot application 204 can calculate the recommended sale price by determining a probability that the second user will quit negotiating if the current sale price is raised by a certain amount. The bot application 204 can in some cases determine whether the probability is greater than certain threshold.

For example, the bot application 204 can calculate that if the first user raises the price by $10, then the probability of the second user quitting the negotiation is over 80%. If the bot application 204 determines that 80% is greater than the threshold, then the bot application will recommend a sale price that is raised by a lower amount than the $10. The bot application 204 may recommend that the sale price is not increased at all. The bot application 204 can use a learning algorithm that analyzes a negotiation history of the second user.

At 610, the bot application determines whether to provide the recommended sale price to the first chat application instance via the chat session. If the bot application determines to provide the recommended sale price to the first chat application instance via the chat session, the flow proceeds to 612. If the bot application determines not to provide the recommended sale price to the first chat application instance, the flow ends.

At 612, the bot application transmits, via the chat bot, a third chat text to the first chat session, the third chat text for causing a first user interface of a first user device hosting the first chat application instance to present the recommended sale price. The third chat text is also for causing the first user interface to present a request for selection, from a first user of the first chat application instance, whether the chat bot is to transmit a fourth chat text to cause, in the UI 120(2) of user device 114(2), a presentation of the recommended sale price.

In some embodiments, the bot application 204 can also search the social media service 110, as well as the social media service 210, for a second chat session that is related to an another negotiation of an another sale of an another item, where the item is of a same type as the another item. Thus, the bot application 204 can search the social media service 210 to select the chat session 206 where there's another negotiation of a similar item, e.g., another bicycle. The bot application 204 can access, via the chat bot 202, the second chat session 206 between a third chat application instance 112(3) and a fourth chat application instance 212(1). The bot application 204 can then transmit, via the chat bot 102, a fifth chat text to the chat session 106. The fifth chat text can indicate to the first chat application instance 112(1) that another negotiation is being conducted in the chat session 206.

The bot application 204 can also determine in some embodiments whether to provide, to the third chat application instance 112(3), information regarding the current sale price of the item. If the bot application 204 determines to provide the current sale price information, the bot application 204 can provide, via the chat bot 202, another chat text to the second chat session 206. The another chat text can cause the UI 120(3) to present a request for selection, from a second user of the chat application instance 112(3), an another sale of the item to the first user instead of to a user of the chat application instance 112(1).

In some embodiments, the bot application 204 can search online resources for information related to sale prices of items that are of a same type as the item being negotiated in the chat session 106. For example, the bot application 204 can search online resources for sales of bicycle of the type being negotiated in the chat session 106. The bot application 204 can also determine whether to provide the online sale prices to the chat application instance 112(1).

If the bot application 204 determines to provide the online sale prices to the chat application instance 112(1), the bot application 204 can transmit, via the chat bot 102, a chat text to the chat session 106, the chat text indicating the online sale prices.

The bot application 204 can in some embodiments determine whether a chat text provided via the chat session 106 indicates that the recommended sale price (i.e., as provided at 612) is accepted by the chat application instance 112(2). For example, the bot application 204 can monitor, via the chat bot 102, chat texts provided by the chat application instance 112(2) to determine whether the user of the user device 114(2) accepts the recommended sale price. If the bot application 204 determines that the recommended sale price is accepted by the chat application instance 112(2), the bot application 204 can transmit, via the chat bot 102, a chat text to the chat session 106. This chat text can cause the UI 120(1) to present a request for a fund transfer to a payment account linked with the chat application instance 112(2). The request for the fund transfer can be for an amount that corresponds to the recommended sale price.

Figure 7:
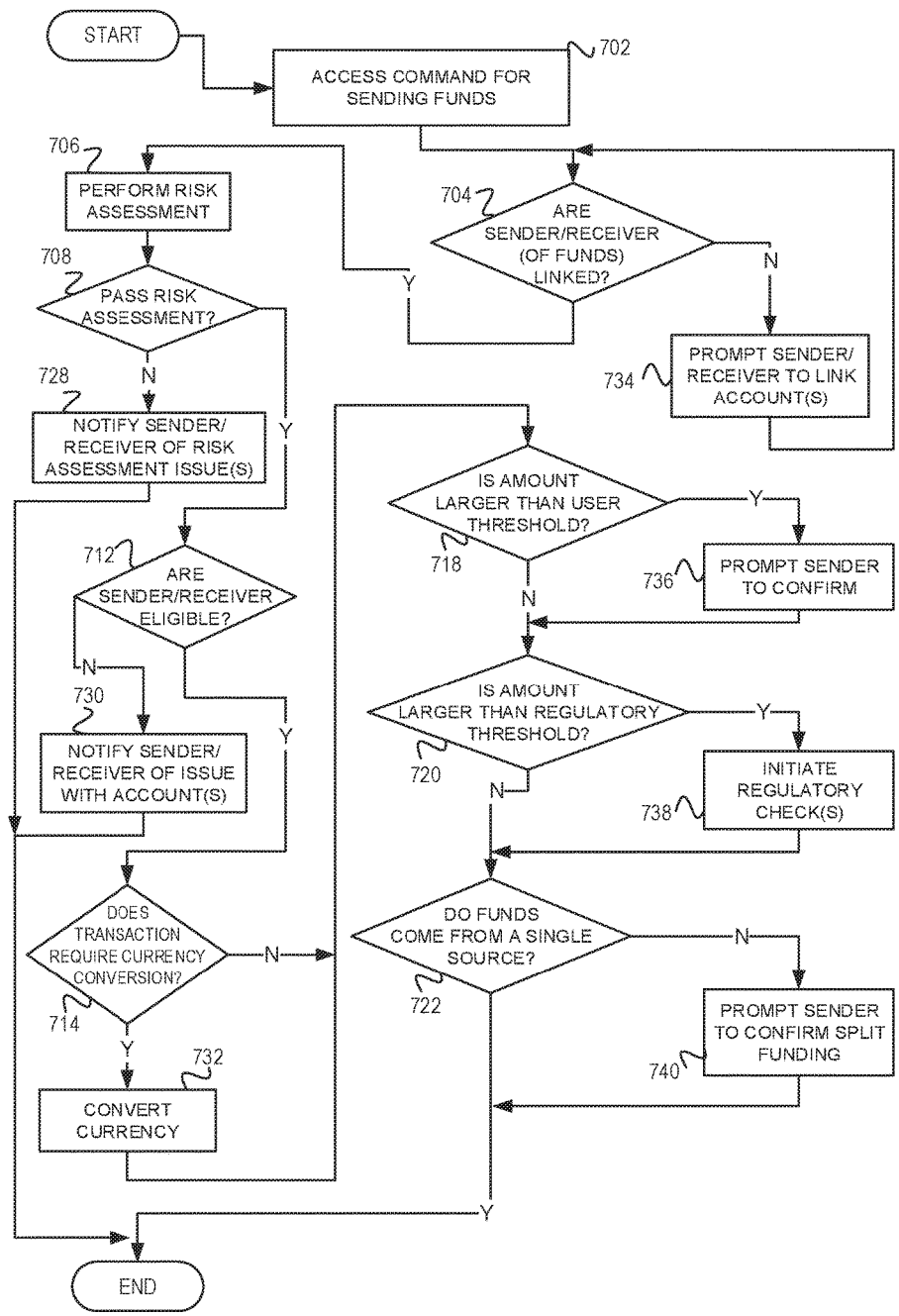
FIG. 7 is a flow diagram illustrating one embodiment of operations for processing a send funds financial transaction via a bot application.

If the bot application 204 determines that the recommended sale price is accepted by the chat application instance 112(2), some embodiments of the bot application 204 can determine to link a chat account of the chat application instance 112(1) with one of payment systems. For example, the bot application 204 can select the payment system 216(1) based on various financial characteristics, as well as on transaction characteristics of the financial transaction of transferring funds for the sale of the bicycle. The bot application 204 can transmit, via the chat bot 102, a chat text to the chat session 106. This chat text can cause the UI 120(1) to present a linking login. The linking login is for linking the chat account with a payment account of the selected payment system FIG. 7 is a flow diagram illustrating one embodiment of operations for processing a send funds financial transaction via a bot application. The method of FIG. 7 is described with reference to the systems and components described in FIGS. 1 and 2 (for illustration purposes and not as a limitation). The example operations can be carried out by the bot application 104 or by the bot application 204. With relation to the chat application instances 112(1) and 112(2), a sender is a chat application (e.g., the chat application instance 112(1)) that is attempting to send funds via a financial transaction. Similarly, a receiver is a chat application (e.g., the chat application instance 112(2)) that is attempting to receive funds via the financial transaction.

At 702, the bot application 104 accesses a command for sending funds, such as in a chat text of a chat session 106. At 704, the bot application 104 determines whether the sender and/or receiver are linked with payment accounts. For example, the bot application 104 can determine whether the chat application instances 112(1) and/or 112(2) (or chat accounts associated with the chat application instances 112 (1) and/or 112(2)) are linked with respective payment accounts at the payment system 116. If the bot application 104 determines that the sender and/or receiver are linked with payment accounts, the flow proceeds to 706. If the bot application 104 determines that the sender and/or receiver are not linked with payment accounts, the flow proceeds to 734.

At 706, the bot application 104 performs risk assessment. The risk assessment may be performed on the sender and/or receiver. In one embodiment, the bot application 104 can perform the risk assessment by itself In another embodiment, the bot application 104 can instruct with the payment system 116 to perform the risk assessment. At 708, the bot application 104 determines whether the sender and/or receiver pass the risk assessment. If the bot application 104 determines that the sender and/or receiver pass the risk assessment, flow proceeds to 712. If the risk assessment is not passed, flow continues to 728.

At 712, the bot application 104 determines whether the sender and/or receiver are eligible. Even if the sender and receiver pass the risk assessment and are linked with a payment system, in some cases the sender and/or received may still not be eligible for the financial transaction indicted at 702, such as due to insufficient funds or a hold on the payment account. For example, the sender may be ineligible to send money due to an issue with the sender's account at the payment system 116. If the bot application 104 determines that the sender and/or receiver are eligible, flow proceeds to 714. If the risk assessment is not passed, flow continues to 730.

At 714, the bot application 104 determines whether the transaction (i.e., the financial transaction for sending funds as indicated at 702) requires a currency conversion. For example, the bot application 104 can determine that the sender and the receiver are located in different countries. Thus, the transaction may require that the funds are sent from the sender in currency A, and received at the receiver in currency B. If the bot application 104 determines that the transaction requires a currency conversion, flow proceeds to 732. If no currency conversion is required, flow continues to 718.

At 718, the bot application 104 determines whether the amount indicated by the transaction of 702 is larger than a threshold. If the bot application 104 determines that the amount is larger than a threshold, flow proceeds to 736. If the amount is not larger than the regulatory threshold, flow continues to 720. The threshold can be specified by the user via the chat application instance, such as when linking an account of the chat application instance with a payment account.

At 720, the bot application 104 may determine whether the amount indicated by the transaction of 702 is larger than a regulatory threshold. At 720, some embodiments of the bot application 104 can communicate with the payment system 116. If the bot application 104 determines that the amount is larger than the regulatory threshold, flow proceeds to 738. If the amount is not larger than the regulatory threshold, flow continues to 722. The regulatory threshold can be specified by a governmental agency and/or by a financial institution.

At 722, the bot application 104 determines whether the funds come from a single source. The bot application 104 can in some cases communicate with the payment system 116 to make this determination. If the funds for the transaction of 702 come from a single source, the flow proceeds to 724. If the funds for the transaction come from multiple sources, the flow proceeds to 740.

At 728, the bot application 104 notifies the sender and/or the receiver of issues with risk assessment, as determined at 706. Depending on the risk assessment issue, some embodiments of the bot application 104 can determine to notify the sender of receiver risk assessment issues, or to notify the receiver of sender risk assessment issues. For example, the bot application 104 can send a chat text, via the chat bot 102, to the chat session 106. The chat text could be only accessible by the chat application instance 112(1) (i.e., the sender in this example), and indicate that the chat application instance 112(2) (i.e., the receiver in this example) has risk assessment issues. At 730, the bot application notifies the sender and/or receiver of account issues that are not related to risk assessment issues.

At 734, the bot application 104 prompts the sender and/or receiver whether to link the accounts. For example, the bot application 104 can transmit a chat text, via the chat bot 102, to the chat session 106 to prompt the user of the chat application instance 112(1) (i.e., the sender) to link the chat account associated with the chat application instance 112(1) with a payment account. At 736, the bot application 104 prompts the sender to confirm the amount being indicated at 702. For example, bot application 104 can transmit, via the chat bot 102, a chat text requesting a user to select, via the UI 120(1), whether the amount being indicated at 702 is correct.

At 738, the bot application 104 initiates regulatory checks. In one embodiment, the bot application 104 can instruct the payment system 116 to initiate the regulatory checks. In another embodiment, the payment system 116 can initiate the regulatory checks in response to the determination of 720. At 740, the bot application 104 prompts the sender to confirm split funding. For example, bot application 104 can transmit, via the chat bot 102, a chat text requesting a user to select, via the UI 120(1), that the funding for the amount being indicated at 702 is coming from multiple funding sources.

Figure 8:
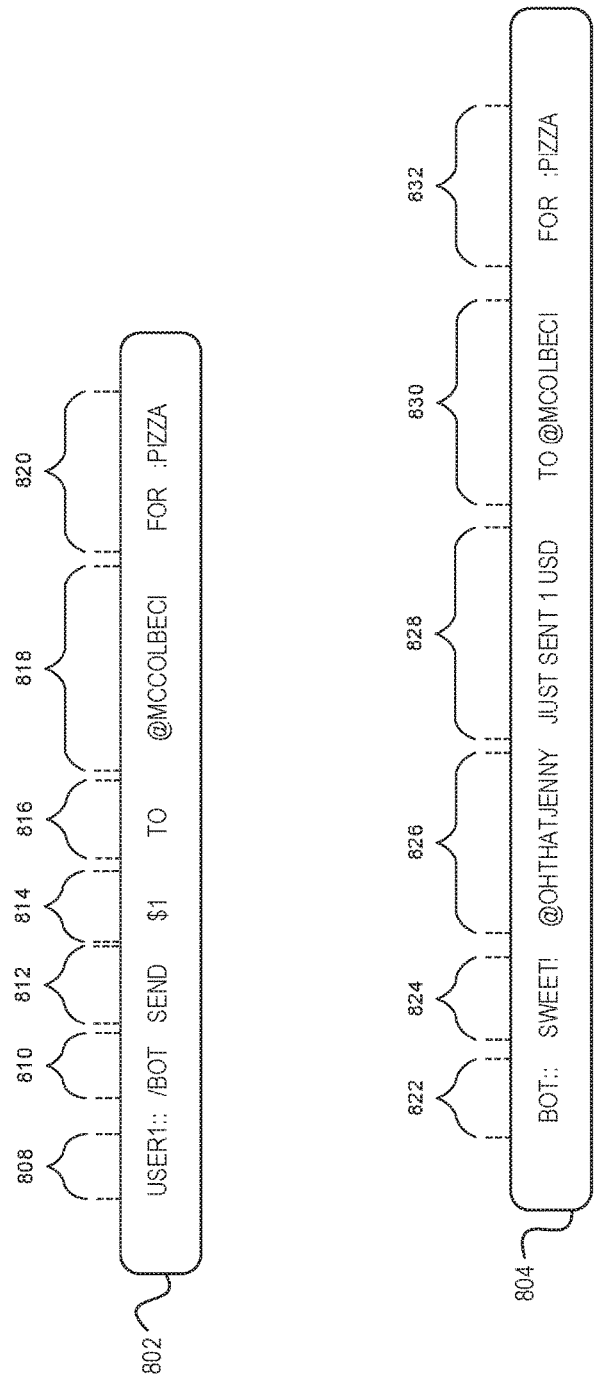
FIG. 8 illustrates one embodiment of communication for processing a send funds financial transaction in a chat session via a chat bot.

FIG. 8 illustrates one embodiment of communication for processing a send funds financial transaction in a chat session via a chat bot. Chat text 802 illustrates a chat text that can be provided, by the chat application instance 112(1), to the chat session 106. Chat text 804 illustrates a chat text that can be transmitted, via the chat bot 102 of the bot application 104, to the chat session 106. The chat texts 802 and 804 can illustrate the sending of funds as discussed above with reference to FIG. 3. The financial transaction of chat texts 802 and 804 is for sending of 1 USD from a payment account linked with the chat account with a user name of "ohthatjenny" to a payment account linked with the chat account with a user name of "mccolbeci."

The chat text 802 can include chat text portions (also referred to as "portions") 808-820. The bot application 104 can receive, via the chat bot 102, the chat text 802 and parse the various portions 808-820, such as to determine the financial transaction. In the depicted example embodiments, the portion 808 of "user1:" indicates that the chat application instance 112(1) is transmitting the chat text 802. The portion 810 of "/bot" indicates that the chat text 802 is addressed to the chat bot 102. The portion 812 of "send" indicates a financial transaction of sending funds. The portion 814 of "$1" indicates that an amount to be transferred when sending funds.

The portion 818 of "@mccolbeci" indicates a user name associated with a chat account for the chat application instance 112(2). Thus, the chat text 802 indicates the chat account of the intended receiver of the funds. The bot application 104 may link the chat application instance indicated at 818 with a payment account at the payment system 116. The portion 820 of "for: pizza" indicates the reason for the sending funds transaction of 812.

The chat text 804 can include portions 822-832. The bot application 104 can transmit, via the chat bot 102, the chat text 804 to the chat session 106. The bot application 104 can transmit the chat text 804 after performance of the method of FIG. 2. In the depicted example embodiment, the portion 822 of "bot:" indicates that the chat bot 102 is transmitting the chat text 804. The portion 824 of "sweet!" is generated by the bot application 104 to indicate success of completion of the financial transaction indicated by the chat text 802. The portion 826 of "@ohthatjenny" indicates a user name for the chat account associated with the chat application instance 112(1). The portion 828 of "just sent 1 USD" indicates the details of the financial transaction indicated by the chat text 802. The chat text 830 of "to @mccolbeci" indicates a user name of the chat account associated with the chat application instance 112(2). The portion 832 of "for: pizza" indicates the reason for the financial transaction of 828.

Figure 9:
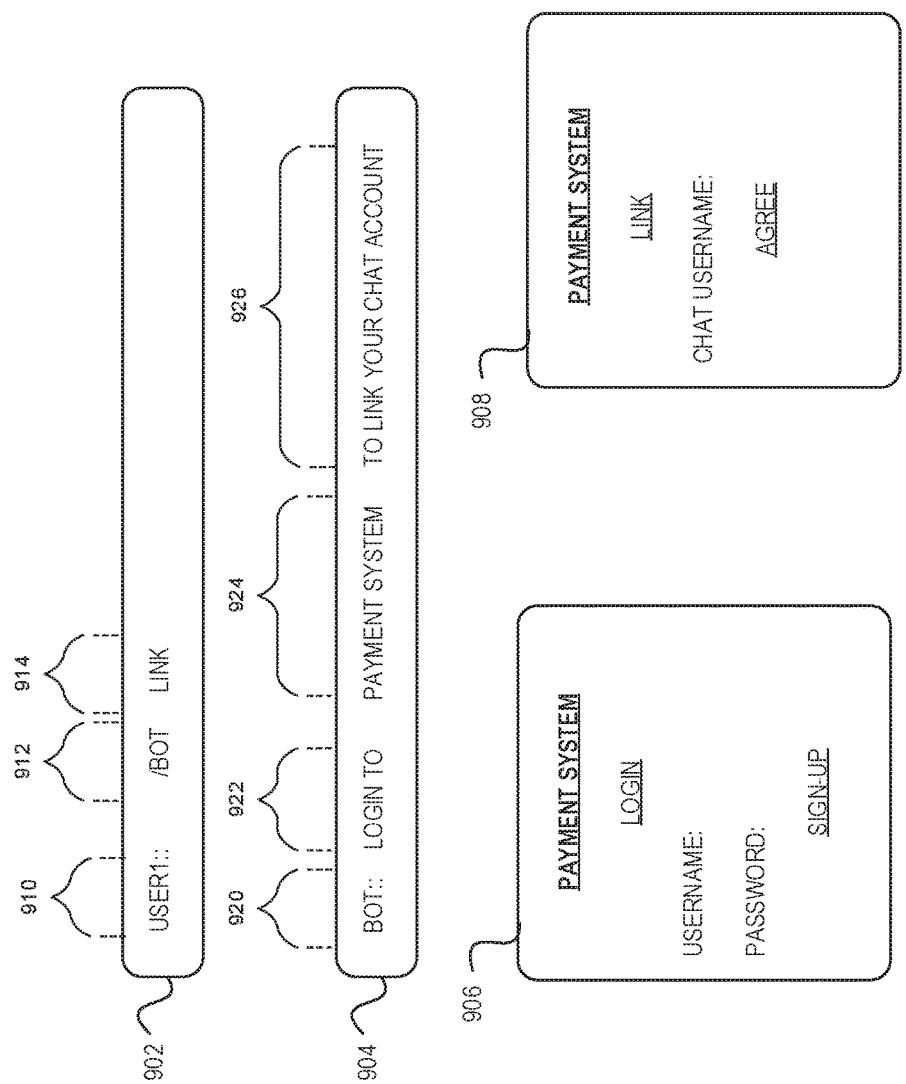
FIG. 9 illustrates one embodiment of communication for accessing payment accounts in a chat session via a chat bot.

FIG. 9 illustrates one embodiment of communication for accessing payment accounts in a chat session via a chat bot. Chat text 902 illustrates a chat text that can be provided, by the chat application instance 112(1), to the chat session 106. Chat text 904 illustrates a chat text that can be transmitted, via the chat bot 102 of the bot application 104, to the chat session 106. Elements 906 and 908 illustrate linking logins that can be displayed at the UI 120(1).

The chat text 902 can include chat text portions (also referred to as "portions") 910-914. The bot application 104 can receive, via the chat bot 102, the chat text 902 and parse the various portions 910-914, to determine a command to link accounts. In the depicted embodiment, the portion 910 of "user1:" indicates that the chat application instance 112(1) is transmitting the chat text 902. The portion 912 of "/bot" indicates that the chat text 902 is addressed to the chat bot 102. The portion 812 of "link" indicates a linking command.

The chat text 904 can include chat text portions (also referred to as "portions") 820-826. The bot application 104 can transmit, via the chat bot 102, the chat text 904 to the chat session 106. In the depicted embodiment, the portion 920 of "bot:" indicates that the chat bot 102 is transmitting the chat text 904. The portion 922 of "login to" indicates a prompt that is intended for the user of the user device 114(1). The portion 924 of "payment system" indicates the payment system 116 for linking with the chat account of the chat application instance 112(1). The portion 926 of "to link your chat account" indicates an explanation of the linking of the payment system 116 with the chat account of the chat application instance 112(1).

The element 906 illustrates a linking login for display on the UI 120(1) of the user device 114(1). The linking login is for linking the chat account of the chat application instance 112(1) with a payment account of the payment system 116. The UI can receive a username and a password for linking the account of the payment system 116 with the chat account. The element 908 displays another linking login that can link the payment account with the chat account, without receiving a password or username.

Figure 10:
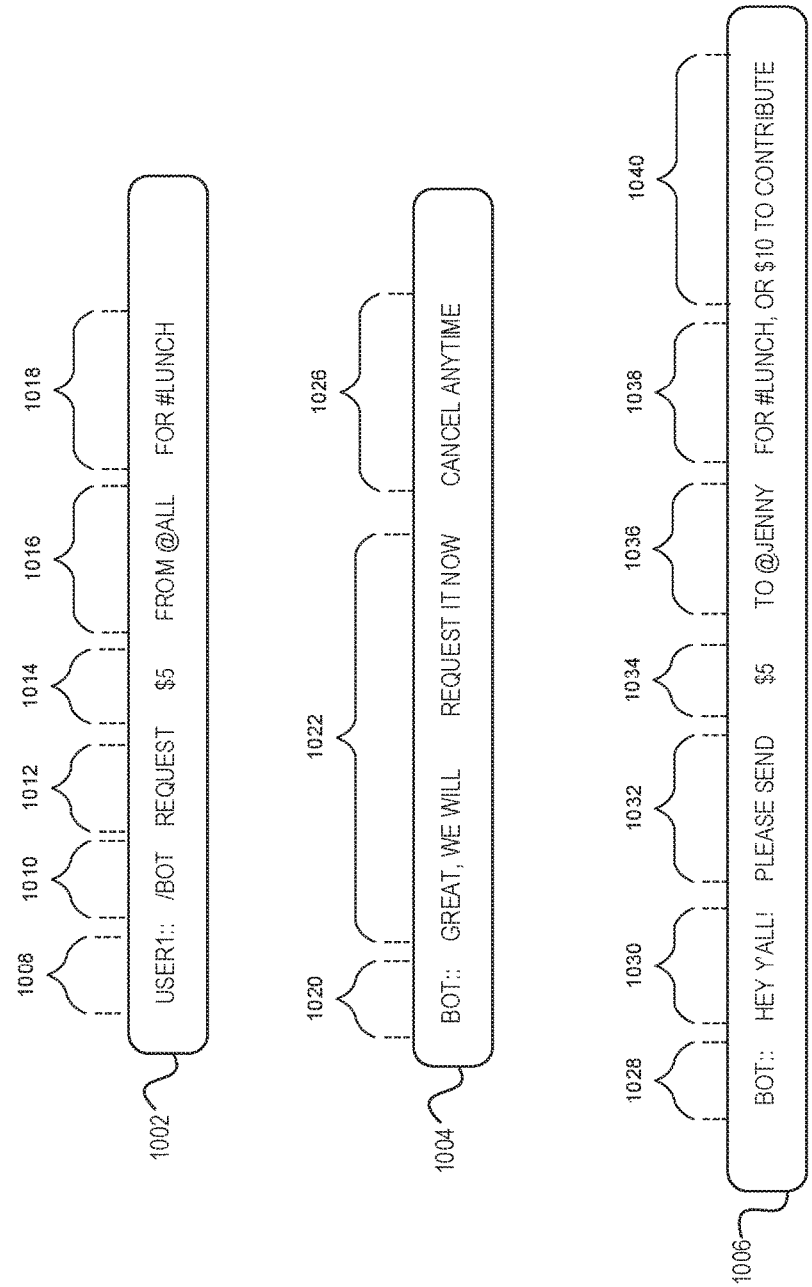
FIG. 10 illustrates one embodiment of communication for processing a request funds financial transaction in a chat session via a chat bot.

FIG. 10 illustrates one embodiment of communication for processing a request funds command in a chat session via a chat bot. FIG. 10 is described with reference to FIG. 2. Chat text 1002 illustrates a chat text that can be provided, by the chat application instance 112(1), to the chat session 106. Chat text 1004 illustrates a chat text that can be transmitted, via the chat bot 102 of the bot application 104, to the chat session 106 and also via the chat bot 202 to the chat session 206. The chat texts 802 and 804 can illustrate the requesting of funds.

The chat text 1002 can include portions 1008-01018. The bot application 104 can receive, via the chat bot 102, the chat text 1002 and parse the various portions 1008-1018, such as to determine the financial transaction. In the depicted embodiment, the portion 808 of "user1:" indicates that the chat application instance 112(1) is transmitting the chat text 1002. The portion 1010 of "/bot" indicates that the chat text 1002 is addressed to the chat bot 102. The portion 1012 of "request" indicates a financial transaction of requesting funds. The portion 1014 of "$5" indicates that an amount that is requested. The portion 1016 of "from @all" indicates to whom the bot should send individual fund requests. The portion 1018 of "for #lunch" indicates the reason for the transaction of requesting funds. In one embodiment, the chat application instance 112(1) can send a single emoji, such as a pizza, instead of portions 1014 and 1018. A single emoji can indicate both the amount and the reason for the transaction.

The chat text 1004 can include portions 820-826. The bot application 104 can transmit, via the chat bot 102, the chat text 1004 to the chat session 106. The chat text 1004 is intended to be received only by the chat application instance 112(1), and not by other chat application instances participating in the chat session 106. The bot application 104 can transmit the chat text 1004 before performance of the transaction indicated by the chat text 1002. In the depicted embodiment, the portion 1020 of "bot:" indicates that the chat bot 102 is transmitting the chat text 1004. The portion 1022 of "great, we will request it now" indicates an action that will be taken by the bot application 104 in response to receiving the requesting funds transaction. The portion 1026 of "cancel anytime" indicates that the user of the chat application instance 112(1) can send a cancellation command to the chat session 106 to cancel the requesting funds transaction.

The chat text 1006 can include portions 1028-1040. The bot application 104 can transmit, via the chat bot 102, the chat text 1004 to the chat session 106. In the depicted embodiment, the bot application can also determine that one of the chat application instances indicated by "@all" is only available in another chat session 206. In this case, the bot application 104 can also transmit, via the chat bot 202, the chat text 1004 to the chat session 206.

The chat text 1006 in some embodiments is intended to be received by all of the chat application instances in each of the chat sessions 106 and 206. The portion 1028 of "bot:" indicates that the chat bot 102 (or the chat bot 202) is transmitting the chat text 1004. The portion 1030 of "hey y'all" is a greeting. The portion 1032 of "please send" indicates a request to transfer funds. The portion 1034 of "$5" indicates amount that is requested. The portion 1036 of "@jenny" indicates the requester of the transaction. The portion 1038 of "for #lunch" indicates the reason for the requesting funds transaction of 1002. The portion 1040 of "or $10 to contribute" indicates a request to contribute extra funds to the requester.

Figure 11:
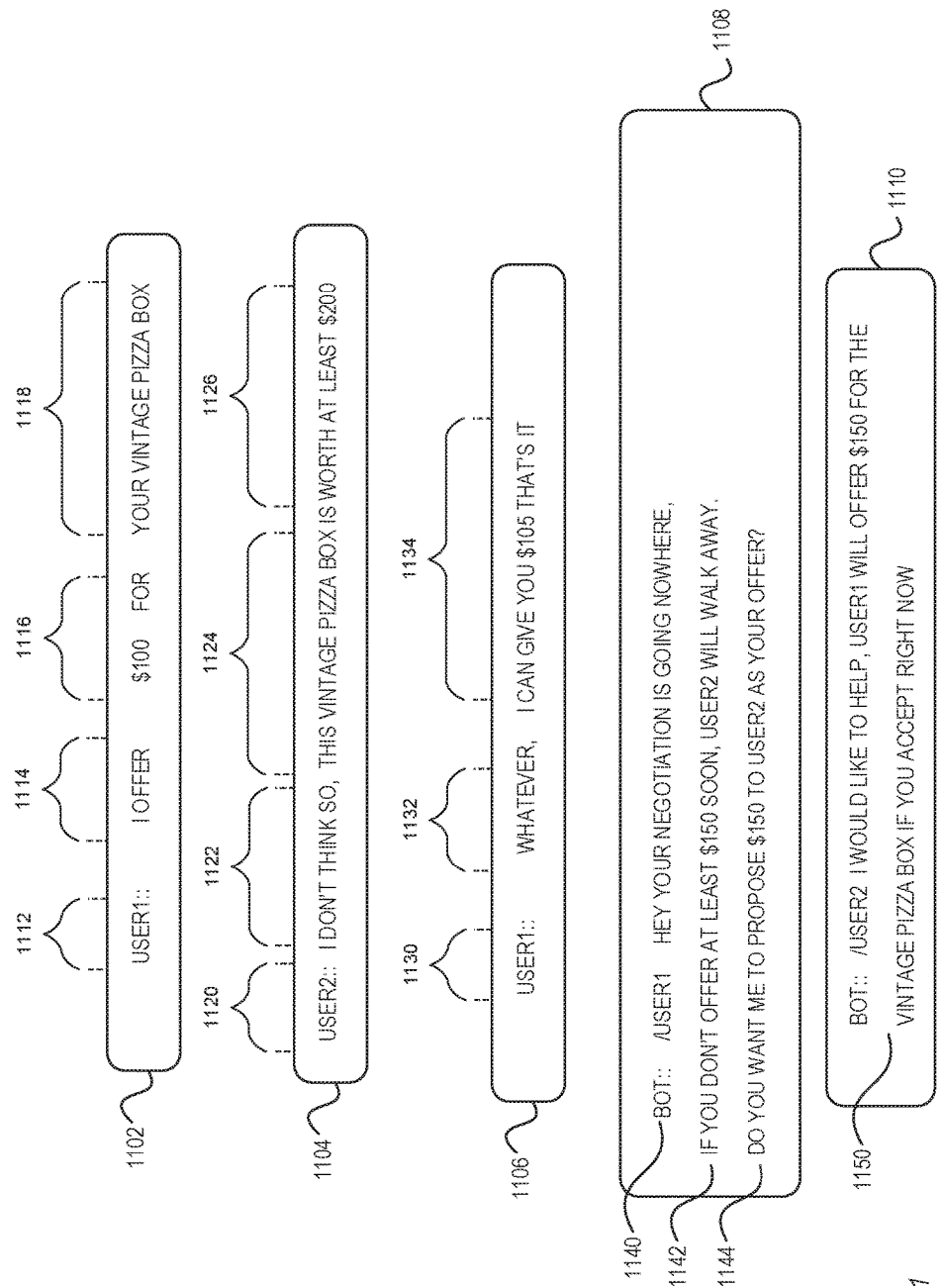
FIG. 11 illustrates one embodiment of communication for providing real-time recommendations for negotiations in chat sessions via a chat bot.

FIG. 11 illustrates one embodiment of communication for providing real-time recommendations for negotiations in chat sessions via a chat bot. FIG. 11 is described with reference to FIG. 2. Chat texts 1102 and 1106 illustrate chat texts that can be provided, by the chat application instance 112(1), to the chat session 106. Chat text 1104 illustrates a chat text that can be provided, by the chat application instance 112(2), to the chat session 106. Chat texts 1008 and 1010 illustrate chat texts that can be transmitted, via the chat bot 102 of the bot application 204, to the chat session 106.

The chat text 1102 can include portions 1012-1018. Similarly, the chat text 1104 can include portions 1120-1026. The bot application 204 can access, via the chat bot 102, the chat texts 1102-1106 and parse the various portions 1012-1018, 1120-1126, and 1130-1134 to determine that the users of the chat application instances 112(1) and 112(2) are negotiating a sale of an item. For example, by parsing portions 1114 and 1134, the bot application 204 can determine that the chat application instance 112(1) is negotiating a current price for the item, i.e., from $100 to $105. By parsing portions 1118 and 1124, the bot application 204 can determine that the item being negotiated is a "vintage pizza box." By parsing portions 1114, 1122, and 1132, the bot application 204 can determine a current negotiating state of the negotiation that is conducted. The bot application 204 can, for example, determine a probability that the user of the chat application instance 112(1) will quit negotiating if the current sale price is raised by a certain amount by the user of the chat application instance 112(2).

The bot application 204 can provide, via the chat bot 102, the chat text 1108 that indicates, at portion 1140, to the chat application instance 112(1) a status of the negotiation as determined by the bot application 104. At portion 1142, the bot application 204 can indicate, to the chat application instance 112(1), a recommended sale price as calculated the bot application 104 based on the chat texts 1102-1106. At portion 1144, the bot application 204 can also present a request for selection whether the chat bot 102 is to transmit another chat text to the chat application instance 112(2) that presents the recommended sale price to the user of the chat application instance 112(2). The bot application 204 can provide, via the chat bot 102, the chat text 1110 that presents, at portion 1150, to the chat application instance 112(2), the recommended sale price.

Figure 12:
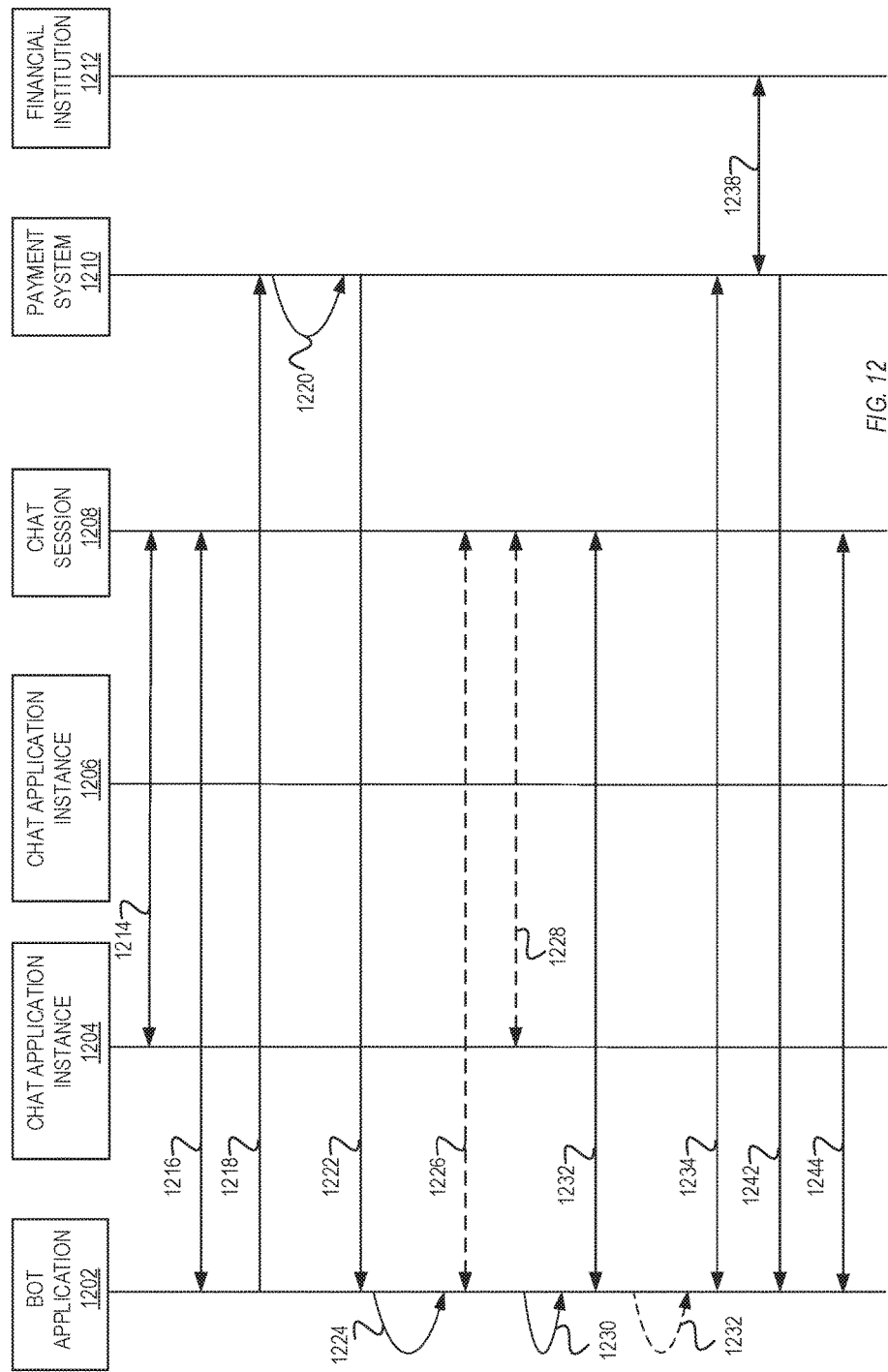
FIG. 12 is a timing diagram illustrating one embodiment of communication between a bot application and chat application instances via a chat session for accessing payment accounts and for processing financial transactions.

FIG. 12 is a timing diagram illustrating one embodiment of communication between a bot application and chat application instances via a chat session for accessing payment accounts and for processing financial transactions. As shown by FIG. 12, a bot application 1202 communicates, via a chat bot (not shown) with the chat application instances 1204 and 1206, using a chat session 1208. The bot application 1202 also communicates with a payment system 1210, which in turn communicates with a financial institution 1212. The communications of FIG. 12 can be performed over one or more communication networks. Portions of the timing diagram of FIG. 12 correspond to the flow diagrams of FIGS. 3-5.

At 1214, the chat application instance 1204 can provide a chat text to the chat session 1208. The chat text can include a command for a financial transaction. At 1216, the bot application 1202 can access the chat text to determine the financial transaction. At 1218, the bot application 1202 can access the payment system 1210 to determine whether a chat account associated with the chat application instance 1204 is linked with a payment account at the payment system 1210. At 1220, the payment system 1210 can determine whether chat account associated with the chat application instance 1204 is linked with a payment account at the payment system 1210.

At 1222, the payment system can communicate with the bot application 1202 to indicate whether the chat account associated with the chat application instance 1204 is linked with a payment account at the payment system 1210. At 1224, the bot application 1202 can determine whether to link the chat account associated with the chat application instance 1204 with the payment system 1210 (or with another payment system). At 1226, the bot application 1202 can transmit a chat text to the chat session 1208 to present a linking login for the chat application instance 1204. At 1228, the chat application instance 1204 can communicate with the payment system 1210 to link its chat account the payment account. It is noted that lines representing the communication 1226 and 1228 are dashed, indicating that the communication 1226 and 1228 is optional, depending on the determination at 1224.

At 1230, the bot application 1202 can determine whether the financial transaction can be performed. For example, the chat text accessed at 1216 can indicate the financial transaction other than linking of accounts, e.g., for sending funds. At 1232, the bot application 1202 can transmit a chat text to the chat session 1208 to indicate to the chat application instance 1204 that the financial transaction can be performed. At 1234, the bot application 1202 can send instructions to the payment system 1210 to perform the financial transaction. As noted, the payment system 1210 can perform the transaction using batching, or using another technique. Optionally, the bot application 1202 can also send, at 1234, the instructions after expiration of a certain time-out period, as indicated by 1232.

At 1238, the payment system 1210 can communicate with the financial institution 1212 to finalize the financial transaction, such as obtain or deposit funds associated with the user's payment account. At 1242, the payment system 1210 can communicate with the bot application 1202 to indicate whether the financial transaction was successfully performed. At 1244, the bot application 1202 can transmit a chat text to the chat session 1208 to indicate to the chat application instance 1204 whether the financial transaction was successful.

Figure 13:
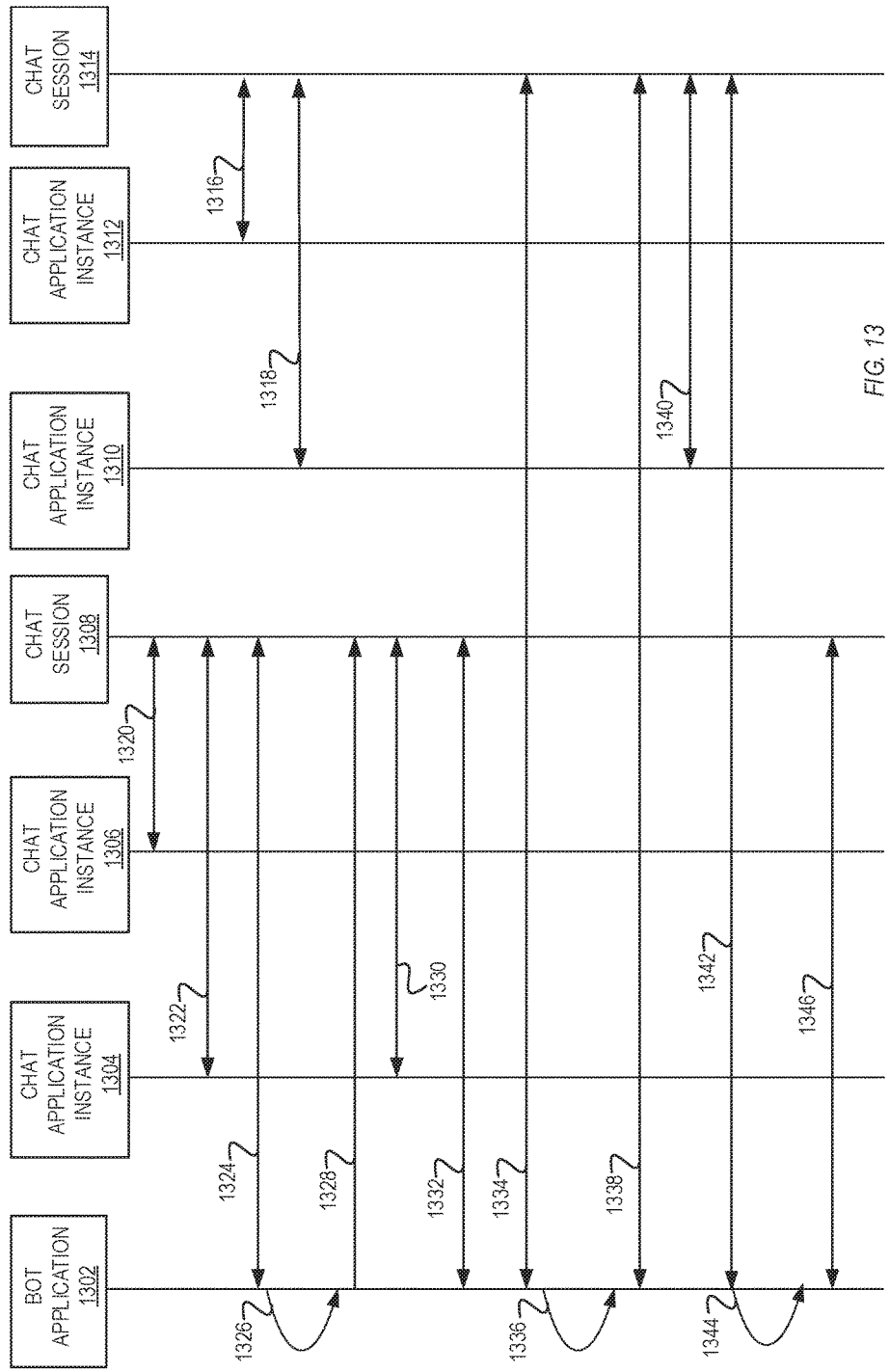
FIG. 13 is a timing diagram illustrating one embodiment of communication between a bot application and chat application instances via multiple chat sessions for providing real-time recommendations for negotiations.

FIG. 13 is a timing diagram illustrating one embodiment of communication between a bot application and chat application instances via multiple chat sessions for providing real-time recommendations for negotiations. As shown by FIG. 13, a bot application 1302 communicates, via a chat bot (not shown) with the chat application instances 1304 and 1306, using a chat session 1308. The bot application 1302 can also communicate via another chat bot (not shown) with the chat application instances 1308 and 1310, using a chat session 1314. The communications of FIG. 13 can be performed over one or more communication networks. Portions of the timing diagram of FIG. 13 correspond to the flow diagram of FIGS. 6.

At 1320 and 1322, the chat application instances 1306 and 1304 provide chat texts to the chat session 1308. At 1324, the bot application 1324 can access the chat texts (of 1320 and 1322) from the chat session 1308. At 1326, the bot application 1302 can determine that the chat texts 1320 and 1322 are directed to negotiation of a sale of an item. At 1326, the bot application 1302 can also calculate a recommended sale price for the item being negotiated. At 1326, the bot application 1302 can also determine whether to provide the recommended sale price to the chat application instance 1304 via the chat session 1308. At 1328, the bot application 1302 can transmit a chat text to the chat session 1308 to cause a UI of a user device hosting the chat application instance 1304 to present the recommended sale price. The chat text of 1328 can also cause the user interface to present a request for selection, from a user of the chat application instance 1304, whether bot application 1302 is to transmit another chat text to cause, in a user interface of a user device hosting the chat application instance 1306, a presentation of the recommended sale price.

At 1332, the bot application 1302 can access chat texts 1316 and 1318 from the chat session 1314. At 1336, the bot application 1302 can determine that the chat texts 1316 and 1318 are directed to another negotiation. At 1336, the bot application 1302 can determine that the another negotiation is directed to a sale of another item, where the items being negotiated in chat sessions 1308 and 1314 are of the same type. At 1338, the bot application 1302 can transmit a chat text to the chat session 1314. The chat text of 1338 can cause a user interface of a user device hosting the chat application instance 1310 to present a request for selection the sale of the item to the chat application instance 1302 instead of to the chat application instance 1312. At 1340, the chat application instance 1310 can provide a chat text to the chat session 1314, such as to indicate whether the user of the chat application instance 1310 selects top sell the item to the chat application instance 1302 instead of to the chat application instance 1312.

At 1342, the bot application 1302 accesses the chat text provided in the chat session 1314. At 1344, the bot application 1302 determines whether to present the sale of the item by the chat application instance 1310 to the chat application instance 1304. At 1346, the bot application 1302 provides a chat text to the chat session 1308 regarding the sale of the item by the chat application instance 1310.

It should be understood that FIGS. 1-13 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIGS. 3-7, 12, and 13 may be omitted, described in a different sequence, or combined as desired or appropriate.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flow diagram illustrations and/or block diagrams of methods, apparatus (systems) and computer program products according to embodiments of the inventive subject matter. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 14:
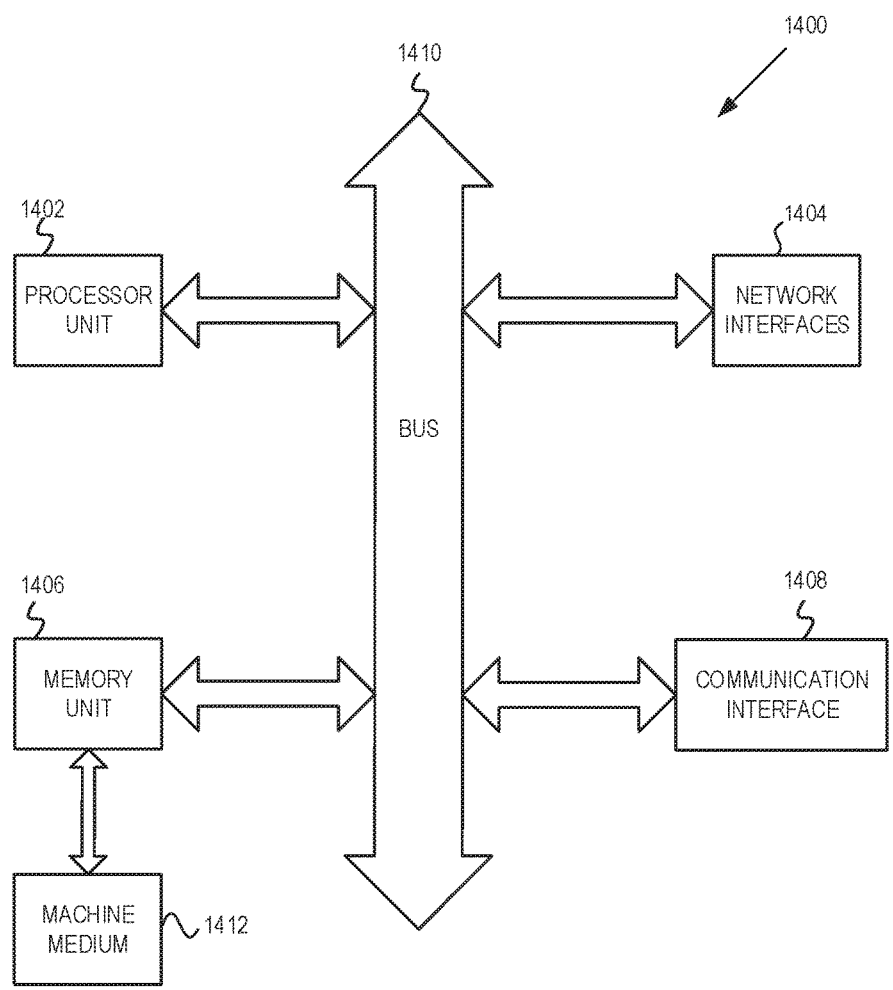
FIG. 14 is a block diagram of one embodiment of an electronic device used in the communication system of FIGS. 1 and 2.

FIG. 14 is a block diagram of an exemplary embodiment of an electronic device 1400 including a communication interface 1408 for network communications. In some implementations, the electronic device 1400 may be one of a laptop computer, a tablet computer, a mobile phone, a powerline communication device, a smart appliance (PDA), a user device, a server, or another electronic system. The electronic device 1400 can include processor unit 1402 (possibly including multiple processors, multiple cores, multiple nodes, and/or implementing multi-threading, etc.). The electronic device 1400 can also include memory unit 1406. The memory unit 1406 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Electronic device 1400 can also include bus 1410 (e.g., PCI, ISA, PCI-Express, HyperTransport®, InfiniBand®, NuBus, AHB, AXI, etc.), and a network interfaces 1404 can include wire-based interfaces (e.g., an Ethernet interface, a powerline communication interface, etc.). The communication interface 1408 can include at least one of a wireless network interface (e.g., a WLAN interface, a Bluetooth interface, a WiMAX interface, a ZigBee interface, a Wireless USB interface, etc.), In some implementations, electronic device 1400 may support multiple network interfaces—each of which is configured to couple the electronic device 1400 to a different communication network.

The memory unit 1406 can embody functionality to implement embodiments described in FIGS. 1-13 above. In one embodiment, the memory unit 1406 can include one or more of functionalities that facilitate communicating in chat sessions using chat bots to access financial transaction, to access payment accounts, and to provide real-time recommendations for negotiations. Any one of these functionalities may be partially (or entirely) implemented in hardware and/or on the processor unit 1402. For example, some functionality may be implemented with an application specific integrated circuit, in logic implemented in the processor unit 1402, in a co-processor on a peripheral device or card, etc. Further, realizations may include fewer or additional components not illustrated in FIG. 14 (e.g., video cards, audio cards, additional network interfaces, peripheral devices, etc.). Processor unit 1402, memory unit 1406, network interface 1404 and the communication interface 1408 are coupled to bus 1410. Although illustrated as being coupled to the bus 1410, memory unit 1406 may be coupled to processor unit 1402.

While the embodiments are described with reference to various implementations and exploitations, it will be understood that these embodiments are illustrative and that the scope of the inventive subject matter is not limited to them.

In general, techniques for using chat bots as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for communicating in chat sessions using chat bots to provide real-time recommendations for negotiations, the method comprising:

detecting, by one or more hardware processors, that a first chat session is initiated between a first chat application instance and a second chat application instance;

instantiating, by the one or more hardware processors, a first chat bot for simulating a chat application instance within the first chat session;

determining, by one or more hardware processors using the first chat bot, that at least a first chat text and a second chat text are provided in the first chat session by the first chat application instance and the second chat application instance, respectively;

parsing, by the one or more hardware processors, the first chat text and the second chat text to determine that a negotiation of a sale of an item is taking place in the first chat session;

determining, by the one or more hardware processors, a recommended sale price for the item, based, at least in part, on the first chat text and the second chat text;

determining, by the one or more hardware processors, whether to provide the recommended sale price to the first chat application instance via the first chat session; and in response to determining to provide the recommended sale price to the first chat application instance, causing, by the one or more hardware processors, the first chat bot to insert a third chat text into the first chat session, wherein inserting the third chat text into the first chat session causes a first user interface of the first chat application instance to present the recommended sale price and a user interface element selectable to request for a transmission of a fourth chat text comprising the recommended sale price to the second chat application instance.

2. The method of claim 1, wherein the determining the recommended sale price comprises determining a likelihood that a first user associated with the first chat application instance and a second user associated with the second chat application instance will agree to complete the sale of the item at the recommended sale price.

3. The method of claim 1, wherein the determining the recommended sale price comprises:

determining a first offer price offered by a first user associated with the first chat application instance by parsing at least the first chat text;

determining a probability that a second user associated with the second chat application instance will quit negotiating if the first offer price is raised by a first amount;
determining whether the probability is greater than a threshold; and
in response to determining that the probability is greater than the threshold, determining the recommended sale price by raising the first offer price by a second amount that is larger than the first amount.

4. The method of claim 3, wherein the probability is determined based on a learning algorithm that analyzes a negotiation history of the second user.

5. The method of claim 1, wherein the item is a first item, and wherein the method further comprises:
determining a second chat session related to a second negotiation of a sale of a second item, wherein the second item is of a same type as the first item;
accessing, via the first chat bot, the second chat session to determine a negotiated price of the second item; and
causing the first chat bot to insert a fifth chat text into the first chat session, the fifth chat text indicating the negotiated price of the second item.

6. The method of claim 1, wherein the item is a first item, and wherein the method further comprises:
determining a second chat session related to a second negotiation of a sale of a second item being a same type as the first item between a third chat application instance and a fourth chat application instance;
accessing, via the first chat bot, the second chat session;
determining an offer price of the first item offered by a first user associated with the first chat application instance based on the parsing the first chat text and the second chat text; and
causing the first chat bot to insert a fifth chat text into the second chat session, wherein inserting the fifth chat text into the second chat session causes a third user interface of the third chat application instance to present the offer price offered by the first user.

7. The method of claim 1, wherein the item is a first item, and wherein the method further comprises:
searching online resources for information related to an actual sale price of a second item, wherein the second item is of a same type as the first item; and
transmitting, via the chat bot, a fifth chat text to the first chat session, the chat text indicating the actual sale price of the second item.

8. The method of claim 1, further comprising:
determining whether the recommended sale price is accepted by a first user associated with the first chat application instance and a second user associated with the second chat application instance by parsing at least a fifth chat text in the first chat session; and
in response to determining that the recommended sale price is accepted, causing the first chat bot to insert a sixth chat text into the first chat session, wherein inserting the sixth chat text into the first chat session causes the first user interface of the first chat application instance to present a request for a fund transfer to a payment account linked with the second chat application instance, the request for the fund transfer for an amount corresponding to the recommended sale price.

9. The method of claim 8, further comprising processing, through a payment system, the fund transfer.

10. A system comprising:
a non-transitory memory storing instructions; and
one or more hardware processors coupled to the non-transitory memory and configured to execute the instructions to cause the system to perform operations comprising:
detecting that a first chat session is initiated between a first chat application instance and a second chat application instance;
instantiating a first chat bot for simulating a chat application instance within the first chat session;
determining that at least a first chat text and a second chat text are provided in the first chat session by the first chat application instance and the second chat application instance, respectively;
parsing the first chat text and the second chat text to determine that a negotiation of a sale of an item is taking place in the first chat session;
calculating a recommended sale price for the item, based, at least in part, on the first chat text and the second chat text;
determining whether to provide the recommended sale price to the first chat application instance via the first chat session; and
in response to a determination to provide the recommended sale price to the first chat application instance, causing the first chat bot to insert a third chat text into the first chat session, wherein inserting the third chat text into the first chat session causes a first user interface of the first chat application instance to present the recommended sale price and a user interface element selectable to request for a transmission of a fourth chat text comprising the recommended sale price to the second chat application instance.

11. The system of claim 10, wherein the operations further comprise:
determining a first offer price offered by a first user associated with the first chat application instance by parsing at least the first chat text;
determining a probability that a second user associated with the second chat application instance will quit negotiating if the first offer price is raised by a first amount;
determining whether the probability is greater than a threshold; and
in response to determining that the probability is greater than the threshold, determining the recommended sale price by raising the first offer price by a second amount larger than the first amount.

12. The system of claim 11, wherein the probability is generated based on a learning algorithm that analyzes a negotiation history of the second user.

13. The system of claim 10, wherein the item is a first item, and wherein the operations further comprise:
determining a second chat session related to a second negotiation of a sale of a second item, wherein the second item is of a same type as the first item;
accessing, via the first chat bot, the second chat session to determine a negotiated price of the second item; and
causing the first chat bot to insert a fifth chat text into the first chat session, the fifth chat text indicating the negotiated price of the second item.

14. The system of claim 10, wherein the item is a first item, and wherein the operations further comprise:
determining a second chat session related to a second negotiation of a sale of a second item being a same type as the first item between a third chat application instance and a fourth chat application instance;

accessing, via the first chat bot, the second chat session;
determining an offer price of the first item offered by a first user associated with the first chat application instance based on the parsing the first chat text and the second chat text; and
causing the first chat bot to insert a fifth chat text into the second chat session, wherein inserting the third chat text into the second chat session causes a third user interface of the third chat application instance to present the offer price offered by the first user.

15. The system of claim 10, wherein the operations further comprise:
determining whether the recommended sale price is accepted by a first user associated with the first chat application instance and a second user associated with the second chat application instance by parsing a fifth chat text in the first chat session; and
in response to a determination that the recommended sale price is accepted, causing the first chat bot to insert a sixth chat text into the first chat session, wherein inserting the sixth chat text into the first chat session causes the first user interface of the chat application instance to present a request for a fund transfer to a payment account linked with the second chat application instance, the request for the fund transfer for an amount corresponding to the recommended sale price.

16. A non-transitory machine-readable medium having stored thereon machine-readable instructions executable to cause a machine to perform operations comprising:
detecting that a first chat session is initiated between a first chat application instance and a second chat application instance;
instantiating a first chat bot for simulating a chat application instance within the first chat session;
determining, using the first chat bot, that a first chat text and a second chat text are provided in the first chat session by the first chat application instance and the second chat application instance, respectively;
parsing the first chat text and the second chat text to determine that a negotiation of a sale of an item is taking place in the first chat session;
calculating a recommended sale price for the item, based, at least in part, on the first chat text and the second chat text;
determining whether to provide the recommended sale price to the first chat application instance via the first chat session; and
in response to determining to provide the recommended sale price to the first chat application instance, causing the first chat bot to insert a third chat text into the first chat session, wherein inserting the third chat text into the first chat session causes a first user interface of the first chat application instance to present the recommended sale price and a user interface element selectable to request for a transmission of a fourth chat text comprising the recommended sale price to the second chat application instance.

17. The non-transitory machine-readable medium of claim 16, wherein the determining the recommended sale price comprises:
determining a first offer price offered by a first user associated with the first chat application instance by parsing at least the first chat text;
determining a probability that a second user associated with the second chat application instance will quit negotiating if the first offer price is raised by a first amount;
determining whether the probability is greater than a threshold; and
in response to a determination that the probability is greater than the threshold, determining the recommended sale price by raising the first offer price by a second amount that is larger than the first amount.

18. The non-transitory machine-readable medium of claim 17, wherein the probability is determined based on a learning algorithm that analyzes a negotiation history of the second user.

19. The non-transitory machine-readable medium of claim 16, wherein the item is a first item, and wherein the operations further comprise:
determining a second chat session related to a second negotiation of a sale of a second item, wherein the second item is of a same type as the first item;
accessing, via the first chat bot, the second chat session to determine a negotiated price of the second item; and
causing the first chat bot to insert a fifth chat text to the first chat session, the fifth chat text indicating the negotiated price of the second item.

20. The non-transitory machine-readable medium of claim 16, wherein the operations further comprise:
determining whether the recommended sale price is accepted by a first user associated with the first chat application instance and a second user associated with the second chat application instance by parsing at least a fifth chat text in the first chat session; and
in response to a determination that the recommended sale price is accepted, causing the first chat bot to insert a sixth chat text into the first chat session, wherein inserting the fifth chat text into the first chat session causes the first user interface of the first chat application instance to present a request for a fund transfer to a payment account linked with the second chat application instance, the request for the fund transfer for an amount corresponding to the recommended sale price.

* * * * *